United States Patent
Byrne et al.

(10) Patent No.: US 9,047,642 B2
(45) Date of Patent: Jun. 2, 2015

(54) SOCIAL CHOICE ENGINE

(75) Inventors: Patrick Michael Byrne, Salt Lake City, UT (US); Susan Park, Salt Lake City, UT (US)

(73) Assignee: Overstock.com, Inc., Salt Lake City, UT (US)

( * ) Notice: Subject to any disclaimer, the term of this patent is extended or adjusted under 35 U.S.C. 154(b) by 335 days.

(21) Appl. No.: 13/297,100

(22) Filed: Nov. 15, 2011

(65) Prior Publication Data

US 2012/0246579 A1  Sep. 27, 2012

Related U.S. Application Data

(60) Provisional application No. 61/467,020, filed on Mar. 24, 2011.

(51) Int. Cl.
*G06F 3/01* (2006.01)
*G06Q 50/00* (2012.01)

(52) U.S. Cl.
CPC ...................................... *G06Q 50/01* (2013.01)

(58) Field of Classification Search
CPC .......................... G06F 3/0482; G06F 17/30554
USPC .......................................... 715/753, 762, 744
See application file for complete search history.

(56) References Cited

U.S. PATENT DOCUMENTS

| | | | |
|---|---|---|---|
| 3,573,747 A | 4/1971 | Adams et al. | |
| 3,581,072 A | 5/1971 | Nymeyer | |
| 4,412,287 A | 10/1983 | Braddock, III | |
| 4,674,044 A | 6/1987 | Kalmus et al. | |
| 4,677,552 A | 6/1987 | Sibley, Jr. | |
| 4,789,928 A | 12/1988 | Fujisaki | |
| 4,799,156 A | 1/1989 | Shavit et al. | |
| 4,808,987 A | 2/1989 | Takeda et al. | |
| 4,823,265 A | 4/1989 | Nelson | |
| 4,854,516 A | 8/1989 | Yamada | |
| 4,903,201 A | 2/1990 | Wagner | |

(Continued)

FOREIGN PATENT DOCUMENTS

| | | |
|---|---|---|
| CA | 2253543 | 10/1997 |
| CA | 2347812 | 5/2000 |

(Continued)

OTHER PUBLICATIONS

2ROAM, Inc., multiple archived pages of www.2roam.com retrieved via Internet Archive Wayback Machine on Jun. 10, 2008.

(Continued)

*Primary Examiner* — Daeho Song
(74) *Attorney, Agent, or Firm* — Clayton, Howarth & Cannon, P.C.

(57) ABSTRACT

A social choice engine is disclosed for eliciting and receiving responses to questions or issues and ranking the responses using the Borda ranking system. The social choice engine provides a user interface to a survey administrator that allows for the defining of the social choice survey. The social choice engine also provides a pick list of possible participants, where the possible participants are members of an online community. To administer the social choice survey, the social choice engine sends electronic notifications to selected participants. The participants respond to the social choice survey through a user interface that includes interactive features. The results of the social choice survey are then displayed to the survey administrator.

20 Claims, 17 Drawing Sheets

(56) References Cited

U.S. PATENT DOCUMENTS

| | | |
|---|---|---|
| RE33,316 E | 8/1990 | Katsuta et al. |
| 5,027,110 A | 6/1991 | Chang et al. |
| 5,053,956 A | 10/1991 | Donald et al. |
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,301,350 A | 4/1994 | Rogan et al. |
| 5,305,200 A | 4/1994 | Hartheimer et al. |
| 5,325,297 A | 6/1994 | Bird et al. |
| 5,329,589 A | 7/1994 | Fraser et al. |
| 5,347,632 A | 9/1994 | Filepp et al. |
| 5,375,055 A | 12/1994 | Togher et al. |
| 5,394,324 A | 2/1995 | Clearwater |
| 5,407,433 A | 4/1995 | Loomas |
| 5,411,483 A | 5/1995 | Loomas et al. |
| 5,426,281 A | 6/1995 | Abecassis |
| 5,485,510 A | 1/1996 | Colbert |
| 5,493,677 A | 2/1996 | Balogh et al. |
| 5,553,145 A | 9/1996 | Micali |
| 5,557,728 A | 9/1996 | Garrett et al. |
| 5,579,471 A | 11/1996 | Barber et al. |
| 5,596,994 A | 1/1997 | Bro |
| 5,598,557 A | 1/1997 | Doner et al. |
| 5,640,569 A | 6/1997 | Miller et al. |
| 5,657,389 A | 8/1997 | Houvener |
| 5,664,111 A | 9/1997 | Nahan et al. |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,721,908 A | 2/1998 | Lagarde et al. |
| 5,722,418 A | 3/1998 | Bro |
| 5,727,165 A | 3/1998 | Ordish et al. |
| 5,737,599 A | 4/1998 | Rowe et al. |
| 5,760,917 A | 6/1998 | Sheridan |
| 5,761,496 A | 6/1998 | Hattori |
| 5,761,655 A | 6/1998 | Hoffman |
| 5,761,662 A | 6/1998 | Dasan |
| 5,771,291 A | 6/1998 | Newton et al. |
| 5,771,380 A | 6/1998 | Tanaka et al. |
| 5,778,367 A | 7/1998 | Wesinger, Jr. et al. |
| 5,790,790 A | 8/1998 | Smith et al. |
| 5,794,216 A | 8/1998 | Brown |
| 5,794,219 A | 8/1998 | Brown |
| 5,796,395 A | 8/1998 | de Hond |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,870,754 A | 2/1999 | Dimitrova et al. |
| 5,872,848 A | 2/1999 | Romney et al. |
| 5,873,069 A | 2/1999 | Reuhl et al. |
| 5,873,080 A | 2/1999 | Coden et al. |
| 5,884,056 A | 3/1999 | Steele |
| 5,890,138 A | 3/1999 | Godin et al. |
| 5,890,175 A | 3/1999 | Wong et al. |
| 5,905,975 A | 5/1999 | Ausubel |
| 5,907,547 A | 5/1999 | Foladare et al. |
| 5,913,215 A | 6/1999 | Rubinstein et al. |
| 5,922,074 A | 7/1999 | Richard et al. |
| 5,924,072 A | 7/1999 | Havens |
| 5,926,794 A | 7/1999 | Fethe |
| 5,948,040 A | 9/1999 | DeLorme et al. |
| 5,948,061 A | 9/1999 | Merriman et al. |
| 5,974,412 A | 10/1999 | Hazlehurst et al. |
| 5,986,662 A | 11/1999 | Argiro et al. |
| 5,987,446 A | 11/1999 | Corey et al. |
| 5,991,739 A | 11/1999 | Cupps et al. |
| 5,999,915 A | 12/1999 | Nahan et al. |
| 6,012,053 A | 1/2000 | Pant et al. |
| 6,029,141 A | 2/2000 | Bezos et al. |
| 6,035,288 A | 3/2000 | Solomon |
| 6,035,402 A | 3/2000 | Vaeth et al. |
| 6,044,363 A | 3/2000 | Mori et al. |
| 6,045,447 A | 4/2000 | Yoshizawa et al. |
| 6,047,264 A | 4/2000 | Fisher et al. |
| 6,055,518 A | 4/2000 | Franklin et al. |
| 6,058,379 A | 5/2000 | Odom et al. |
| 6,058,417 A | 5/2000 | Hess et al. |
| 6,058,428 A | 5/2000 | Wang et al. |
| 6,061,448 A | 5/2000 | Smith et al. |
| 6,065,041 A | 5/2000 | Lum et al. |
| 6,070,125 A | 5/2000 | Murphy et al. |
| 6,073,117 A | 6/2000 | Oyanagi et al. |
| 6,078,914 A | 6/2000 | Redfern |
| 6,085,176 A | 7/2000 | Woolston |
| 6,104,815 A | 8/2000 | Alcorn et al. |
| 6,119,137 A | 9/2000 | Smith et al. |
| 6,128,649 A | 10/2000 | Smith et al. |
| 6,141,010 A | 10/2000 | Hoyle |
| 6,167,382 A | 12/2000 | Sparks et al. |
| 6,178,408 B1 | 1/2001 | Copple et al. |
| 6,185,558 B1 | 2/2001 | Bowman et al. |
| 6,192,407 B1 | 2/2001 | Smith et al. |
| 6,199,077 B1 | 3/2001 | Inala et al. |
| 6,202,051 B1 | 3/2001 | Woolston |
| 6,202,061 B1 | 3/2001 | Khosla et al. |
| 6,226,412 B1 | 5/2001 | Schwab |
| 6,243,691 B1 | 6/2001 | Fisher et al. |
| 6,269,238 B1 | 7/2001 | Iggulden |
| 6,271,840 B1 | 8/2001 | Finseth et al. |
| 6,275,820 B1 | 8/2001 | Navin-Chandra et al. |
| 6,275,829 B1 | 8/2001 | Angiulo et al. |
| 6,356,879 B2 | 3/2002 | Aggarwal et al. |
| 6,356,908 B1 | 3/2002 | Brown et al. |
| 6,366,899 B1 | 4/2002 | Kernz |
| 6,370,527 B1 | 4/2002 | Singhal |
| 6,373,933 B1 | 4/2002 | Sarkki et al. |
| 6,374,260 B1 | 4/2002 | Hoffert et al. |
| 6,381,510 B1 | 4/2002 | Amidhozour et al. |
| 6,415,320 B1 | 7/2002 | Hess et al. |
| 6,434,556 B1 | 8/2002 | Levin et al. |
| 6,456,307 B1 | 9/2002 | Bates et al. |
| 6,460,020 B1 | 10/2002 | Pool et al. |
| 6,466,917 B1 | 10/2002 | Goyal et al. |
| 6,484,149 B1 | 11/2002 | Jammes et al. |
| 6,489,968 B1 | 12/2002 | Ortega et al. |
| 6,522,955 B1 | 2/2003 | Colborn |
| 6,523,037 B1 | 2/2003 | Monahan et al. |
| 6,601,061 B1 | 7/2003 | Holt et al. |
| 6,604,107 B1 | 8/2003 | Wang |
| 6,625,764 B1 | 9/2003 | Dawson |
| 6,643,696 B2 | 11/2003 | Davis et al. |
| 6,661,431 B1 | 12/2003 | Stuart et al. |
| 6,665,838 B1 | 12/2003 | Brown et al. |
| 6,701,310 B1 | 3/2004 | Sugiura et al. |
| 6,718,536 B2 | 4/2004 | Dupaquis |
| 6,728,704 B2 | 4/2004 | Mao et al. |
| 6,732,161 B1 | 5/2004 | Hess et al. |
| 6,732,162 B1 | 5/2004 | Wood et al. |
| 6,856,963 B1 | 2/2005 | Hurwitz |
| 6,889,054 B2 | 5/2005 | Himmel et al. |
| 7,043,450 B2 | 5/2006 | Velez et al. |
| 7,069,242 B1 | 6/2006 | Sheth et al. |
| 7,076,453 B2 | 7/2006 | Jammes et al. |
| 7,080,030 B2 | 7/2006 | Eglen et al. |
| 7,100,111 B2 | 8/2006 | McElfresh et al. |
| 7,100,195 B1 | 8/2006 | Underwood |

(56) References Cited

U.S. PATENT DOCUMENTS

| | | |
|---|---|---|
| 7,117,207 B1 | 10/2006 | Kerschberg et al. |
| 7,127,416 B1 | 10/2006 | Tenorio |
| 7,165,091 B2 | 1/2007 | Lunenfeld |
| 7,167,910 B2 | 1/2007 | Farnham et al. |
| 7,216,115 B1 | 5/2007 | Walters et al. |
| 7,254,547 B1 | 8/2007 | Beck et al. |
| 7,318,037 B2 | 1/2008 | Solari |
| 7,340,249 B2 | 3/2008 | Moran et al. |
| 7,349,668 B2 | 3/2008 | Ilan et al. |
| 7,353,188 B2 | 4/2008 | Yim et al. |
| 7,366,755 B1 | 4/2008 | Cuomo et al. |
| 7,379,890 B2 | 5/2008 | Myr et al. |
| 7,380,217 B2 | 5/2008 | Gvelesiani |
| 7,401,025 B1 | 7/2008 | Lokitz |
| 7,447,646 B1 | 11/2008 | Agarwal et al. |
| 7,454,464 B2 | 11/2008 | Puthenkulam et al. |
| 7,457,730 B2 | 11/2008 | Degnan |
| 7,493,521 B1 | 2/2009 | Li et al. |
| 7,496,582 B2 | 2/2009 | Farnham et al. |
| 7,539,696 B1 * | 5/2009 | Greener et al. ............... 1/1 |
| 7,552,067 B2 | 6/2009 | Nephew et al. |
| 7,565,615 B2 * | 7/2009 | Ebert ........................ 715/762 |
| 7,606,743 B2 | 10/2009 | Orzell et al. |
| 7,610,212 B2 | 10/2009 | Klett et al. |
| 7,653,573 B2 | 1/2010 | Hayes, Jr. et al. |
| 7,834,883 B2 | 11/2010 | Adams |
| 7,912,748 B1 | 3/2011 | Rosenberg et al. |
| 7,983,950 B2 | 7/2011 | DeVita |
| 8,112,303 B2 | 2/2012 | Eglen et al. |
| 8,140,989 B2 | 3/2012 | Cohen et al. |
| 8,260,852 B1 * | 9/2012 | Cselle ........................ 709/204 |
| 8,693,494 B2 * | 4/2014 | Fiatal ........................ 370/449 |
| 2001/0034667 A1 | 10/2001 | Petersen |
| 2001/0034668 A1 | 10/2001 | Whitworth |
| 2001/0044751 A1 | 11/2001 | Pugliese et al. |
| 2001/0047290 A1 | 11/2001 | Petras et al. |
| 2001/0047308 A1 | 11/2001 | Kaminsky et al. |
| 2001/0051996 A1 | 12/2001 | Cooper et al. |
| 2002/0002513 A1 | 1/2002 | Chiasson |
| 2002/0013721 A1 | 1/2002 | Capel et al. |
| 2002/0022995 A1 | 2/2002 | Miller et al. |
| 2002/0023059 A1 | 2/2002 | Bari et al. |
| 2002/0026390 A1 | 2/2002 | Ulenas et al. |
| 2002/0029187 A1 | 3/2002 | Meehan et al. |
| 2002/0042738 A1 | 4/2002 | Srinivasan et al. |
| 2002/0099578 A1 | 7/2002 | Eicher et al. |
| 2002/0099579 A1 | 7/2002 | Stowell et al. |
| 2002/0099602 A1 | 7/2002 | Moskowitz et al. |
| 2002/0107718 A1 | 8/2002 | Morrill et al. |
| 2002/0120537 A1 | 8/2002 | Campbell et al. |
| 2002/0129282 A1 | 9/2002 | Hopkins |
| 2002/0147625 A1 | 10/2002 | Kolke |
| 2002/0161648 A1 | 10/2002 | Mason et al. |
| 2002/0188777 A1 * | 12/2002 | Kraft et al. ................... 710/100 |
| 2002/0198784 A1 | 12/2002 | Shaak et al. |
| 2003/0004855 A1 | 1/2003 | Dutta et al. |
| 2003/0005046 A1 | 1/2003 | Kavanagh et al. |
| 2003/0009362 A1 | 1/2003 | Cifani et al. |
| 2003/0009392 A1 | 1/2003 | Perkowski |
| 2003/0014400 A1 * | 1/2003 | Siegel .............................. 707/3 |
| 2003/0036914 A1 | 2/2003 | Fitzpatrick et al. |
| 2003/0041008 A1 | 2/2003 | Grey et al. |
| 2003/0046149 A1 | 3/2003 | Wong |
| 2003/0069740 A1 | 4/2003 | Zeidman |
| 2003/0069825 A1 | 4/2003 | Burk et al. |
| 2003/0088467 A1 | 5/2003 | Culver |
| 2003/0088511 A1 | 5/2003 | Karboulonis et al. |
| 2003/0093331 A1 | 5/2003 | Childs et al. |
| 2003/0110100 A1 | 6/2003 | Wirth, Jr. |
| 2003/0131095 A1 | 7/2003 | Kumhyr et al. |
| 2003/0139969 A1 | 7/2003 | Scroggie et al. |
| 2003/0158792 A1 | 8/2003 | Perkowski |
| 2003/0163340 A1 | 8/2003 | Fitzpatrick et al. |
| 2003/0167213 A1 | 9/2003 | Jammes et al. |
| 2003/0200156 A1 | 10/2003 | Roseman et al. |
| 2003/0204449 A1 | 10/2003 | Kotas et al. |
| 2003/0217002 A1 | 11/2003 | Enborg |
| 2004/0006509 A1 | 1/2004 | Mannik et al. |
| 2004/0015416 A1 | 1/2004 | Foster et al. |
| 2004/0044563 A1 | 3/2004 | Stein |
| 2004/0055017 A1 | 3/2004 | Delpuch et al. |
| 2004/0073476 A1 * | 4/2004 | Donahue et al. ............... 705/10 |
| 2004/0078388 A1 | 4/2004 | Melman |
| 2004/0117242 A1 | 6/2004 | Conrad et al. |
| 2004/0122083 A1 | 6/2004 | Lippert et al. |
| 2004/0122681 A1 | 6/2004 | Ruvolo et al. |
| 2004/0122855 A1 | 6/2004 | Ruvolo et al. |
| 2004/0128183 A1 * | 7/2004 | Challey et al. ................ 705/10 |
| 2004/0128320 A1 | 7/2004 | Grove et al. |
| 2004/0172323 A1 * | 9/2004 | Stamm ........................ 705/10 |
| 2004/0172379 A1 | 9/2004 | Mott et al. |
| 2004/0174979 A1 | 9/2004 | Hutton et al. |
| 2004/0199496 A1 | 10/2004 | Liu et al. |
| 2004/0204991 A1 | 10/2004 | Monahan et al. |
| 2004/0249727 A1 | 12/2004 | Cook, Jr. et al. |
| 2005/0021666 A1 | 1/2005 | Dinnage et al. |
| 2005/0038733 A1 | 2/2005 | Foster et al. |
| 2005/0044254 A1 | 2/2005 | Smith |
| 2005/0055306 A1 * | 3/2005 | Miller et al. ................... 705/37 |
| 2005/0060664 A1 | 3/2005 | Rogers |
| 2005/0097204 A1 | 5/2005 | Horowitz et al. |
| 2005/0131837 A1 | 6/2005 | Sanctis et al. |
| 2005/0144064 A1 | 6/2005 | Calabria et al. |
| 2005/0193333 A1 * | 9/2005 | Ebert ........................ 715/517 |
| 2005/0197846 A1 | 9/2005 | Pezaris et al. |
| 2005/0197950 A1 | 9/2005 | Moya et al. |
| 2005/0198031 A1 | 9/2005 | Pezaris et al. |
| 2005/0202390 A1 * | 9/2005 | Allen et al. ................... 434/353 |
| 2005/0203888 A1 | 9/2005 | Woosley et al. |
| 2005/0216300 A1 | 9/2005 | Appelman et al. |
| 2005/0273378 A1 | 12/2005 | MacDonald-Korth et al. |
| 2006/0009994 A1 | 1/2006 | Hogg et al. |
| 2006/0010105 A1 | 1/2006 | Sarukkai et al. |
| 2006/0031240 A1 | 2/2006 | Eyal et al. |
| 2006/0041638 A1 | 2/2006 | Whittaker et al. |
| 2006/0058048 A1 | 3/2006 | Kapoor et al. |
| 2006/0069623 A1 | 3/2006 | MacDonald-Korth et al. |
| 2006/0085251 A1 | 4/2006 | Greene |
| 2006/0173817 A1 | 8/2006 | Chowdhury et al. |
| 2006/0206479 A1 | 9/2006 | Mason |
| 2006/0259360 A1 | 11/2006 | Flinn et al. |
| 2006/0271671 A1 | 11/2006 | Hansen |
| 2007/0073641 A1 | 3/2007 | Perry et al. |
| 2007/0078726 A1 | 4/2007 | MacDonald Korth et al. |
| 2007/0100803 A1 | 5/2007 | Cava |
| 2007/0160345 A1 * | 7/2007 | Sakai et al. ................... 386/95 |
| 2007/0162379 A1 | 7/2007 | Skinner |
| 2007/0192168 A1 * | 8/2007 | Van Luchene ................ 705/10 |
| 2007/0192181 A1 | 8/2007 | Asdourian |
| 2007/0206606 A1 * | 9/2007 | Coleman et al. ......... 370/395.52 |
| 2007/0226679 A1 * | 9/2007 | Jayamohan et al. .......... 717/101 |
| 2007/0233565 A1 | 10/2007 | Herzog et al. |
| 2007/0239534 A1 | 10/2007 | Liu et al. |
| 2007/0245013 A1 | 10/2007 | Saraswathy et al. |
| 2007/0260520 A1 | 11/2007 | Jha et al. |
| 2007/0282666 A1 * | 12/2007 | Afeyan et al. ................ 705/10 |
| 2008/0052152 A1 | 2/2008 | Yufik |
| 2008/0082394 A1 * | 4/2008 | Floyd et al. ................... 705/10 |
| 2008/0126205 A1 | 5/2008 | Evans et al. |
| 2008/0126476 A1 | 5/2008 | Nicholas et al. |
| 2008/0133305 A1 | 6/2008 | Yates et al. |
| 2008/0140765 A1 | 6/2008 | Kelaita et al. |
| 2008/0162574 A1 | 7/2008 | Gilbert |
| 2008/0201218 A1 | 8/2008 | Broder et al. |
| 2008/0288338 A1 | 11/2008 | Wiseman et al. |
| 2008/0294536 A1 | 11/2008 | Taylor et al. |
| 2008/0301009 A1 | 12/2008 | Plaster et al. |
| 2009/0006190 A1 | 1/2009 | Lucash et al. |
| 2009/0030755 A1 | 1/2009 | Altberg et al. |
| 2009/0106080 A1 * | 4/2009 | Carrier et al. ................ 705/10 |
| 2009/0106127 A1 | 4/2009 | Purdy et al. |
| 2009/0164323 A1 | 6/2009 | Byrne |
| 2009/0204848 A1 | 8/2009 | Kube et al. |
| 2009/0222348 A1 * | 9/2009 | Ransom et al. ................ 705/14 |

(56) References Cited

U.S. PATENT DOCUMENTS

| | | | |
|---|---|---|---|
| 2009/0240582 A1 | 9/2009 | Sheldon-Neal et al. | |
| 2010/0076816 A1* | 3/2010 | Phillips | 705/10 |
| 2010/0094673 A1 | 4/2010 | Lobo et al. | |
| 2010/0228617 A1* | 9/2010 | Ransom et al. | 705/14.25 |
| 2011/0060621 A1 | 3/2011 | Weller et al. | |
| 2011/0153383 A1* | 6/2011 | Bhattacharjya et al. | 705/7.28 |
| 2011/0196802 A1* | 8/2011 | Ellis et al. | 705/321 |
| 2011/0231226 A1* | 9/2011 | Golden | 705/7.32 |
| 2011/0231383 A1* | 9/2011 | Smyth et al. | 707/707 |
| 2011/0271204 A1* | 11/2011 | Jones et al. | 715/753 |
| 2011/0276513 A1* | 11/2011 | Erhart et al. | 705/347 |
| 2012/0005187 A1* | 1/2012 | Chavanne | 707/711 |
| 2012/0030067 A1 | 2/2012 | Pothukuchi et al. | |
| 2012/0158715 A1* | 6/2012 | Maghoul et al. | 707/728 |
| 2012/0166299 A1 | 6/2012 | Heinstein et al. | |
| 2012/0231424 A1 | 9/2012 | Calman et al. | |
| 2013/0080200 A1 | 3/2013 | Connolly et al. | |
| 2014/0114680 A1* | 4/2014 | Mills et al. | 705/2 |

FOREIGN PATENT DOCUMENTS

| | | |
|---|---|---|
| EP | 0636993 | 4/1999 |
| EP | 0807891 | 5/2000 |
| EP | 1241603 | 3/2001 |
| GB | 2397400 | 7/2004 |
| GB | 2424098 | 9/2006 |
| JP | 2001283083 | 10/2001 |
| WO | 97/17663 | 5/1997 |
| WO | 98/32289 | 7/1998 |
| WO | 98/47082 | 10/1998 |
| WO | 99/59283 | 11/1999 |
| WO | 00/25218 | 5/2000 |
| WO | 01/82135 | 11/2001 |
| WO | 2003/094080 | 11/2003 |
| WO | 2012/093410 | 7/2012 |

OTHER PUBLICATIONS

Alt et al., "Bibliography on Electronic Commerce," Electronic Markets—The International Journal, Oct. 1993, 5 pages, vol. 3, No. 3.
Alt et al., "Computer Integrated Logistics," Electronic Markets—The International Journal, Oct. 1993, 1 page, vol. 1, No. 3.
Anonymous, Image manipulation (image-editing software and image-manipulation systems)(Seybold Special Report, Part II), Seybold Report on Publishing Systems, May 15, 1995, p. S35(9), vol. 24, No. 18.
auctionwatch.com, multiple pages—including search results for "expedition," printed Apr. 21, 2011.
auctiva.com, multiple pages, undated but website copyright date is "1999-2000."
Ball et al., "Supply chain infrastructures: system integration and information sharing," ACM SIGMOD Record, 2002, vol. 31, No. 1, pp. 61-66.
Berger et al., "Random Ultiple-Access Communication and Group Testing," IEEE, 1984.
Braganza, "IS Resarch at Cranfield—A Look at the Future," Electronic Markets—The International Journal, Oct. 1993, 1 page, vol. 3, No. 3.
Brecht et al., "The IM 2000 Research Programme," Electronic Markets—The International Journal, Oct. 1993, 1 page, vol. 3, No. 3.
Business Wire business/technology editors, "Sellers Flock to OutletZoo.com as New Automatic Price Drop Method Moves Excess Inventory Online," Business Wire, Oct. 25, 1999.
Business Wire business editors/high-tech writers, "PictureWorks Technology, Inc. Expands in Real Estate Market with Adoption of Rimfire on REALTOR.com," Business Wire, Nov. 8, 1999.
Business Wire business editors/high-tech writers, "PictureWorks Technology, Inc. Shows Strong Revenue Growth in Internet Imaging Business," Business Wire, Nov. 10, 1999.
Business Wire business editors/high-tech writers, "2Roam Partners with Pumatech to Delivery Wireless Alerts," Business Wire, Dec. 18, 2000.
Business Wire business editors/high-tech writers, "2Roam Takes eHow's How-to Solutions Wireless: With 2Roam, the Web's One-Stop Source for getting Things Done is on More Wireless Devices, with Ability to Purchase Its Products from Anywhere," Business Wire, Oct. 2, 2000.
Business Wire business editors/high-tech writers, "2Roam Drives Hertz to the Wireless Web: Number One Car Rental Company to Provide Customers Wireless Access from Any Device," Business Wire, Aug. 7, 2001.
buy.com, www.buy.com homepage, printed Oct. 13, 2004.
Chen et al., "Detecting Web Page Structure for Adaptive Viewing on Small Form Factor Devices," ACM, May 20-24, 2003.
Clarke, "Research Programme in Supra-organizational Systems," Electronic Markets—The International Journal, Oct. 1993, 2 pages, vol. 3, No. 3.
Clemons et al., "Evaluating the prospects for alternative electronic securities markets," Proceedings of the twelfth international conference on information systems, New York, New York, United States, pp. 53-64, 1991.
friendster.com, homepage and "more info" pages, printed Apr. 29, 2004.
Google News archive search for "2Roam marketing" performed over the date range 2000-2003.
Google News archive search for "2Roam SMS" performed over the date range 2000-2008.
Grabowski et al., "Mobile-enabled grid middleware and/or grid gateways," GridLab—A Grid Application Toolkit and Testbed, Work Package 12—Access for Mobile Users, Jun. 3, 2003.
Graham, "The Emergence of Linked Fish Markets in Europe," Electronic Markets—The International Journal, Jul. 1993, 4 pages, vol. 8, No. 2.
Gunthorpe et al., "Portfolio Composition and the Investment Horizon," Financial Analysts Journal, Jan.-Feb. 1994, pp. 51-56.
Halperin, "Toward a Process Handbook for Organizational Coordination Processes," Electronic Markets—The International Journal, Oct. 1993, 1 page, vol. 3, No. 3.
Hess et al., "Computerized Loan Origination Systems: An Industry Case Study of the Electronic Markets Hypothesis," MIS Quarterly, Sep. 1994, pp. 251-275.
IBM, "Anyonymous Delivery of Goods in Electronic Commerce," IBM Technical Disclosure Bulletin, Mar. 1996, pp. 363-366, vol. 39, No. 3.
IBM, "Personal Optimized Decision/Transaction Program," IBM Technical Disclosure Bulletin, Jan. 1995, pp. 83-84, vol. 38, No. 1.
iCrossing, "iCrossing Search Synergy: Natural & Paid Search Symbiosis," Mar. 2007.
IEEE 100—The Authoritative Dictionary of IEEE Standard Terms, Seventh Edition, 2000. Entire book cited; table of contents, source list, and terms beginning with A included. ISBN 0-7381-2601-2.
Ives et al., "Editor's Comments—MISQ Central: Creating a New Intellectual Infrastructure," MIS Quarterly, Sep. 1994, p. xxxv.
Joshi, "Information visibility and its effect on supply chain dynamics," Ph.D. dissertation, Massachusetts Institute of Technology, 2000 (fig. 4.5; p. 45).
Klein, "Information Logistics," Electronic Markets—The International Journal, Oct. 1993, pp. 11-12, vol. 3, No. 3.
Klein, "Introduction to Electronic Auctions," Electronic Markets—The International Journal, Dec. 1997, 4 pages, vol. 7, No. 4.
Kubicek, "The Organization Gap," Electronic Markets—The International Journal, Oct. 1993, 1 page, vol. 3, No. 3.
Kuula, "Telematic Services in Finland," Electronic Markets—The International Journal, Oct. 1993, 1 page, vol. 3, No. 3.
Lalonde, "The EDI World Institute: An International Approach," Electronic Markets—The International Journal, Oct. 1993, 1 page, vol. 3, No. 3.
Lee et al., "Intelligent Electronic Trading for Commodity Exchanges," Electronic Markets—The International Journal, Oct. 1993, 2 pages, vol. 3, No. 3.
Lee et al., "Electronic Brokerage and Electronic Auction: The Impact of IT on Market Structures," Proceedings of the 29th Annual Hawaii International Conference on System Sciences, 1996, pp. 397-406.

(56) References Cited

OTHER PUBLICATIONS

Lee, "AUCNET: Electronic Intermediary for Used-Car Transactions," Electronic Market—The International Journal, Dec. 1997, pp. 24-28, vol. 7, No. 4.
LIVE365 press release, "Live365 to Offer Opt-In Advertising on Its Website," Oct. 15, 2004.
London Business School, "Overture and Google: Internet Pay-Per-Click (PPC) Advertising Options," Mar. 2003.
M2 Presswire, "Palm, Inc.: Palm unveils new web browser optimised for handhelds; HTML browser offers high-speed web-browsing option," Mar. 13, 2002.
Malone et al., "Electronic Markets and Electronic Hierarchies," Communications of the ACM, Jun. 1987, pp. 484-497, vol. 30, No. 6.
Mansell et al., "Electronic Trading Networks: The Route to Competitive Advantage?" Electronic Markets—The International Journal, Oct. 1993, 1 page, vol. 3, No. 3.
Mardesich, "Onsale takes auction gavel electronic," Computer Reseller News, Jul. 8, 1996, pp. 2, 32.
Marteau, "Shop with One Click, Anywhere, Anytime," Information Management and Consulting, 2000, pp. 44-46, vol. 15, No. 4.
Massimb et al., "Electronic Trading, Market Structure and Liquidity," Financial Analysts Journal, Jan.-Feb. 1994, pp. 39-49.
McGinnity, "Build Your Weapon," PC Magazine, Apr. 24, 2011, printed from www.pcmag.com/print_article2?0,1217,a%253D3955,00.asp.
Meade, "Visual 360: a performance appraisal system that's 'fun,'" HR Magazine, 44, 7, 118(3), Jul. 1999.
"Mediappraise: Mediappraise Receives National Award for Web-Based Technology That Enables Companies to Solve Thorny HR Problem," Dec. 14, 1998.
Medvinsky et al., "Electronic Currency for the Internet," Electronic Markets—The International Journal, Oct. 1993, 2 pages, vol. 3, No. 3.
metails.com, www.metails.com homepage, printed Oct. 13, 2004.
Neches, "Fast—A Research Project in Electronic Commerce," Electronic Markets—The International Journal, Oct. 1993, 4 pages, vol. 3., No. 3.
Neo, "The implementation of an electronic market for pig trading in Singapore," Journal of Strategic Information Systems, Dec. 1992, pp. 278-288, vol. 1, No. 5.
O'Mahony, "An X.500-based Product Catalogue," Electronic Markets—The International Journal, Oct. 1993, 2 pages, vol. 3, No. 3.
"ONSALE: ONSALE Brings Thrill of Auctions and Bargain Hunting Online: Unique Internet retail services debuts with week-long charity auction for the Computer Museum in Boston," May 24, 1995, printed from www.dialogweb.com/cgi/dwclient?dwcommand-,DWEBPRINT%20810-489267.
"ONSALE joins fray as online shopping pcks up speed: Internet Booms," Comptuer Reseller News, Jun. 5, 1995.
Palm, Inc., PalmTM Web Pro Handbook, coypright 2002-2003.
Post et al., "Application of Auctions as a Pricing Mechanism for the Interchange of Electric Power," IEEE Transactions of Power Systems, Aug. 1995, pp. 1580-1584, vol. 10, No. 3.
Preist et al., "Adaptive agents in a persistent shout double auction," International Conference on Information and Computation, Proceedings of the first international conference on information and computation economies, Oct. 25-28, 1998, Charleston, United States, pp. 11-18.
Qualcomm, "Brew Developer Support," printed from web.archive.org/web/20020209194207/http://www.qualcomm.com/brew/developer/support/kb/52.html on Aug. 30, 2007.
RCR Wireless News, "Lockheed Martin to use 2Roam's technology for wireless platform," RCR Wireless News, Sep. 10, 2001.
Reck, "Formally Specifying an Automated Trade Execution System," J. Systems Software, 1993, pp. 245-252, vol. 21.
Reck, "Trading-Process Characteristics of Electronic Auctions," Electronic Markets—The International Journal, Dec. 1997, pp. 17-23, vol. 7, No. 4.
repcheck.com, www.repcheck.com homepage, printed from web.archive.org/web/20020330183132/http://repcheck.com on Sep. 5, 2009.
Resnick et al., "Reputation Systems," Communications of the ACM, Dec. 2000, pp. 45-48, vol. 43, No. 12.
Rockoff et al., "Design of an Internet-based system for remote Dutch auctions," Internet Research: Electronic Networking Applications and Policy, 1995, pp. 10-16, vol. 5, No. 4.
Rose, "Vendors strive to undo Adobe lock-hold," Computer Reseller News, Feb. 5, 1996, No. 66669, p. 71(7).
Rysavy, "Mobile-commerce ASPs do the legwork," Network Computing, Jan. 22, 2001, p. 71, 6 pgs., vol. 12, No. 2.
Saunders, "AdFlight to Offer WAP Ads," Oct. 17, 2000, printed from clickz.com/487531/print.
Schmid, "Electronic Markets," Electronic Markets—The International Journal, Oct. 1993, 2 pages, vol. 3, No. 3.
Schwankert, "Matsushita Taps 2Roam for Wireless Solutions," www.internetnews.com/bus-news.article.php/674811, Feb. 2, 2001.
Sen, "Inventory and Pricing Models for Perishable Products," Doctor of Philosophy Dissertation—University of Southern California, Aug. 2000.
Siegmann, "Nowhere to go but up," PC Week, Oct. 23, 1995, 3 pages, vol. 12, No. 42.
Telephony Staff, "Air-ASP," Telephony Online, Oct. 2, 2000, 3 pages.
Teo, "Organizational Factors of Success in Using EDIS: A Survey of Tradenet Participants," Electronic Markets—The International Journal, Oct. 1993, 2 pages, vol. 3, No. 3.
Tjostheim et al., "A case study of an on-line auction for the World Wide Web," printed from www.nr.no/gem/elcom/puplikasjoner/enter98e.html on Jun. 10, 1990, 10 pages.
Turban, "Auctions and Bidding on the Internet: An Assessment," Electronic Markets—The International Journal, Dec. 1997, 5 pages, vol. 7, No. 4.
ubid.com, "How do I Updated my Address, Phone, Credit Card, Password, etc.?" printed from web.archive.org/web/20010208113903/www.ubid.com/help/topic13asp on Aug. 30, 2007.
ubid.com, "How do I track my shipment?" printed from web.archive.org/web/20010331032659/www.ubid.com/help/topic27.asp on Aug. 30, 2007.
ubid.com, "Can I track all of my bids from My Page?" printed from web.archive.org/web/20010208114049/www.ubid.com/help/topic14.asp on Aug. 30, 2007.
Van Heck et al., "Experiences with Electronic Auctions in the Dutch Flower Industry," Electronic Markets—The International Journal, Dec. 1997, 6 pages, vol. 7, No. 4.
Verizon Wireless, "Verizon Wireless Customers Get It NowSM; Get Games, Get Pix, Get Ring Tones and Get Going in Full Color," press release to PRNewswire, Sep. 23, 2002.
Warbelow et al., "AUCNET: TV Auction Network System," Harvard Business School 9-190-001, Jul. 19, 1989, Rev. Apr. 12, 1996, pp. 1-15.
Weber, "How Financial Markets are Going On-line," Electronic Markets—The International Journal, Oct. 1993, 2 pages, vol. 3, No. 3.
Wireless Internet, "DailyShopper Selects 2Roam to Enable Mobile Customers to Retrieve Nearby Sales and Promotions Information," Wireless Internet, Apr. 2001.
Wireless Week, "Verizon Wireless Gets Going on BREW Agenda," Wireless Week, Sep. 23, 2002.
xchanger.net, webpage printed from www.auctiva.com/showcases/as_4sale.asp?uid=exchanger, undated but at least as early as Oct. 12, 2000.
Yu et al., "Distributed Reputation Management for Electronic Commerce," Computational Intelligence, 2002, pp. 535-549, vol. 18, No. 4.
Zetmeir, Auction Incentive Marketing, print of all pages of website found at home.earthlink.net/~bidpointz/ made Oct. 8, 2004.
Zimmermann, "Integration of Financial Services: The TeleCounter," Electronic Markets—The International Journal, Oct. 1993, 1 page, vol. 3, No. 3.
Zwass, "Electronic Commerce: Structures and Issues," International Journal of Electronic Commerce, Fall 1996, pp. 3-23, vol. 1, No. 1.

\* cited by examiner 119A 210

For each of the foregoing statements, please indicate how likely you think they are, on a scale of 1 to 10, where 1 is "Very Unlikely" and 10 is "Highly Likely"

212                                                                                                              214

UFOs do exist and aliens are visiting our planet regularly — 1 ——————————— 10

Humans will one day visit other planets for holidays — 1 ——————————— 10

The world will end in an apocalyptic catastrophe — 1 ——————————— 10

Dinosaurs are fiction – they never existed — 1 ——————————— 10

Submit

For each of the foregoing statements, please indicate whether you believe the statement is true

232

| | Yes | No |
|---|---|---|
| UFOs do exist and aliens are visiting our planet regularly | ✓ | ☐ |
| Humans will one day visit other planets for holidays | ☐ | ✓ |
| The world will end in an apocalyptic catastrophe | ✓ | ☐ |
| Dinosaurs are fiction – they never existed | ✓ | ☐ |

234

Submit

The follow are the results of whether the selected participants believed the statement to be true

284

| | Yes | No |
|---|---|---|
| UFOs do exist and aliens are visiting our planet regularly | ✓ | ☐ |
| Humans will one day visit other planets for holidays | ☐ | ✓ |
| The world will end in an apocalyptic catastrophe | ✓ | ☐ |
| Dinosaurs are fiction – they never existed | ✓ | ☐ |

286

Main Menu

FIG. 15

SOCIAL CHOICE ENGINE

CROSS-REFERENCE TO RELATED APPLICATIONS

This application claims the benefit of U.S. Provisional Application No. 61/467,020, filed Mar. 24, 2011, which is hereby incorporated by reference herein in its entirety.

STATEMENT REGARDING FEDERALLY SPONSORED RESEARCH OR DEVELOPMENT

Not applicable.

BACKGROUND OF THE INVENTION

1. The Field of the Present Disclosure

The present disclosure relates generally to a social choice engine for seeking and evaluating responses from members of an online community to a social choice survey posed by a survey administrator.

2. Description of Related Art

With the proliferation of social media websites, such as Twitter, Facebook, and Google+, users of such sites have become increasingly interested in the collective knowledge of other online users in regard to a wide variety of topics, including social, business, political, family, and religious issues. This collective knowledge may include the opinions, beliefs, leanings and understandings of the other online users on the social media website. Presently, in order to obtain the collective understanding of other users, the only remedy of a user may be to post a comment with the question on his or her account and wait for responses from the other users. For example, a user of a social media website may wonder if other users of the social media website would recommend a particular restaurant. In this case, the user may post a comment stating "Do recommend Restaurant ABC for Sunday brunch? Please leave a comment if you do." After posting such a comment, the user may return to the social media website periodically to view comments posted by other users.

While the above approach may gain some limited responses in the form of comments from other users, the approach itself is lacking for several reasons. First, because of the constant stream of postings on social media websites, a user's post that is not viewed immediately is often pushed lower in the stream where it is unlikely to be viewed by later arriving users. Thus, the user's post may only receive a limited number of responses. Second, a user's post may invoke a wide range of responses from other users that are difficult to amalgamate into useful information. That is, a user may not be able to ascertain the overall collective knowledge of the other users because of the uncontrolled nature of the responses. Third, a user may wish to limit responses to only a select group of trusted users, and not the entire community. Fourth, in some situations, other users may not be forthcoming if other users are able to read their posts. Other drawbacks to this approach may exists as well.

The same problems described above may apply to an organization, such as a business, attempting to ascertain the attitudes of its members. For example, a company may desire to determine the attitudes of its employees regarding a topic of importance. In the past, organizations may have sent an organization-wide email to all of its members attempting to ascertain the opinions of its members on the topic of importance. Again, this approach is less desirable as amalgamating the responses may be difficult due to the uncontrolled nature of the responses. Further, it may be difficult to track users who have responded and those who have not responded. This is due to the fact that each user may send back a response that much be individually read, evaluated and amalgamated with the other responses. It may be difficult and time consuming to ascertain a true gauge of the members opinions on a topic of interest.

Users of wireless mobile devices may also be interested in the collective knowledge of other users of wireless devices in regard to a wide variety of topics. For example, a user of a wireless mobile device may desire to ascertain the collective knowledge of contacts stored on the wireless mobile device. Presently, there is no adequate solution for users of wireless mobile devices to ascertain and amalgamate responses from other users of wireless devices.

The prior art is thus characterized by several disadvantages that are addressed by the present disclosure. The present disclosure minimizes, and in some aspects eliminates, the above-mentioned failures, and other problems, by utilizing the methods and structural features described herein. The features and advantages of the present disclosure will be set forth in the following description, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which:

FIG. 8 is a diagram of a computer generated user interface that allows a participant to enter responses to a social choice survey in accordance with the present disclosure;

FIG. 10 is a diagram of a computer generated user interface that allows a participant to enter responses to a social choice survey in accordance with the present disclosure;

FIG. 15 is a diagram of an electronic page that displays the results of a social choice survey in accordance with the present disclosure;

DETAILED DESCRIPTION

Before the present social choice engine is disclosed and described, it is to be understood that this invention is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present invention will be limited only by the appended claims and equivalents thereof.

The publications and other reference materials referred to herein to describe the background of the invention and to provide additional detail regarding its practice are hereby incorporated by reference. The references discussed herein are provided solely for their disclosure prior to the filing date of the present application. Nothing herein is to be construed as an admission that the inventors are not entitled to antedate such disclosure by virtue of prior invention.

It must be noted that, as used in this specification and the appended claims, the singular forms "a," "an," and "the" include plural referents unless the context clearly dictates otherwise.

Unless defined otherwise, all technical and scientific terms used herein have the same meanings as commonly understood by one of ordinary skill in the art to which this invention belongs.

In describing and claiming the present invention, the following terminology will be used in accordance with the definitions set out below.

As used herein, "comprising," "including," "containing," "characterized by," and grammatical equivalents thereof are inclusive or open-ended terms that do not exclude additional, unrecited elements or method steps. "Comprising" is to be interpreted as including the more restrictive terms "consisting of" and "consisting essentially of." As used herein, "consisting of" and grammatical equivalents thereof exclude any element, step, or ingredient not specified in the claim. As used herein, "consisting essentially of" and grammatical equivalents thereof limit the scope of a claim to the specified materials or steps and those that do not materially affect the basic and novel characteristic or characteristics of the claimed invention.

Figure 1:
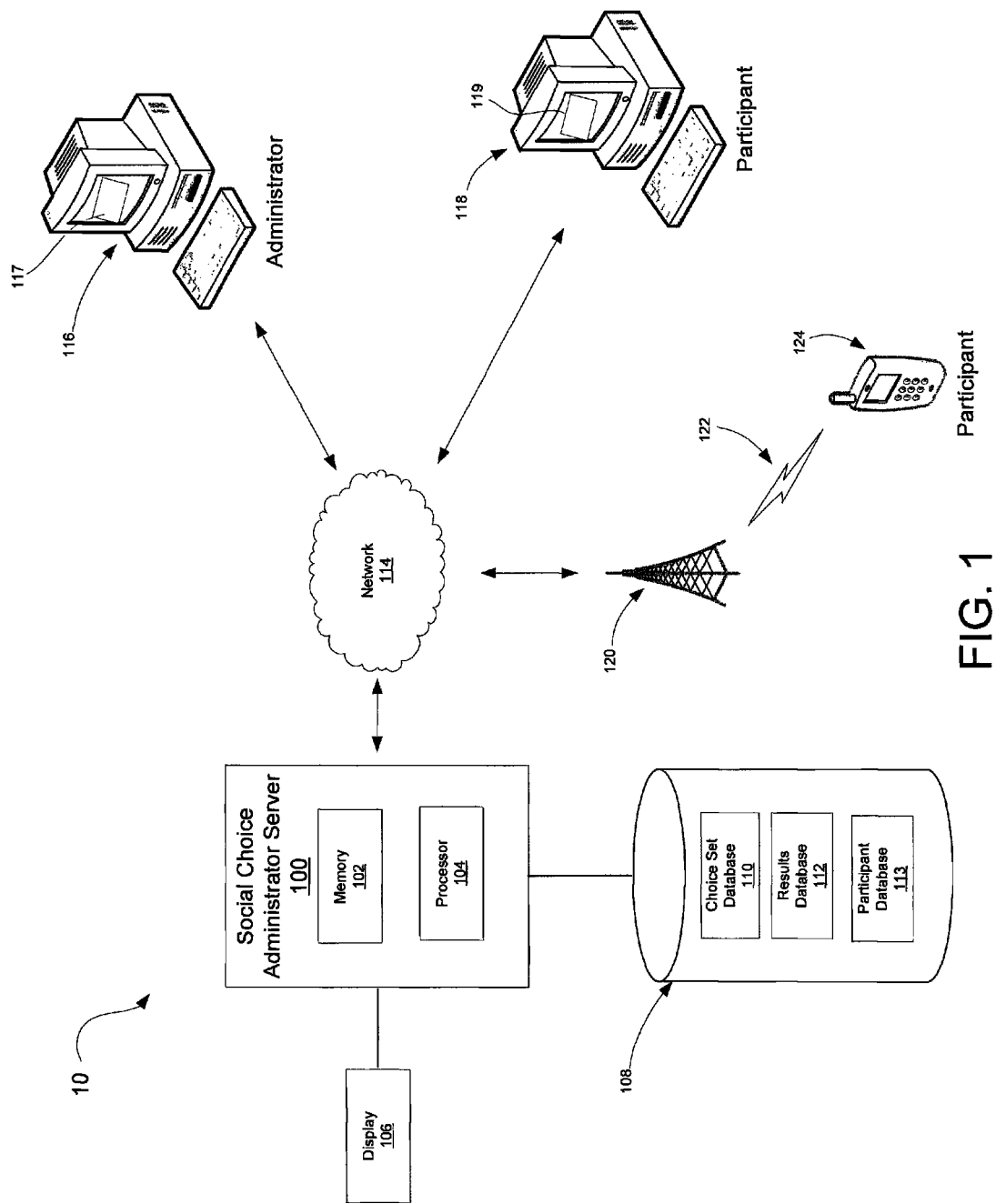
FIG. 1 is a block diagram of a social survey system and environment in which the present invention may be practiced.

Referring now to FIG. 1, there is depicted an exemplary social choice engine environment 10 according to an embodiment of the present disclosure. As shown, the environment 10 includes a social choice administrator server 100 having a memory 102 and a processor 104. The memory 102 may store operating instructions, that when executed by the processor 104, cause the processor 104 to perform operations as is known to one having ordinary skill in the art. A data storage 108 may be in communication with the social choice administrator server 100. The data storage 108 may include a choice set database 110, a results database 112, and a participant database 113. A computer display 106 may be connected to the social choice administrator server 100.

The social choice administrator server 100 may be connected to a network 114, including a network comprised of multiple sub-networks. In an embodiment of the present disclosure, the network 114 may be a wide area network (WAN) or a local area network (LAN). In an embodiment of the present disclosure, the network 114 may include the Internet. The network 114 may provide remote access to the social choice administrator server 100 as is known to one having ordinary skill in the art. In particular, the network 114 may allow a survey administrator using a remote computer 116 to access the social choice administrator server 100. As used herein, the term "administrator" may refer to a user that defines and implements a social choice survey using the social choice administrator server 100.

When requested by the a communication from the remote computer 116, the social choice administrator server 100 may generate a user interface 117 that is displayed on the remote computer 116. The user interface 117 may be generated by operating instructions stored in the memory 102 of the social choice administrator server 100 and executed by the processor 104. The user interface 117 may be delivered over the network 114 to the remote computer 116. In an embodiment of the present disclosure, the user interface 117 may be displayed to an administrator using a program, such as a web browser, running on the remote computer 116 as is known to one having ordinary skill in the art. In an embodiment of the present disclosure, the remote computer 116 may be selected from a desktop computer, a laptop computer, a wireless mobile device, a hand-held computing device or any other computing device capable of communicating over the network 114 with the social choice administrator server 100. The user interface 117 may provide interactive features to allow the administrator to define and implement a social choice survey as explained below.

Figure 2:
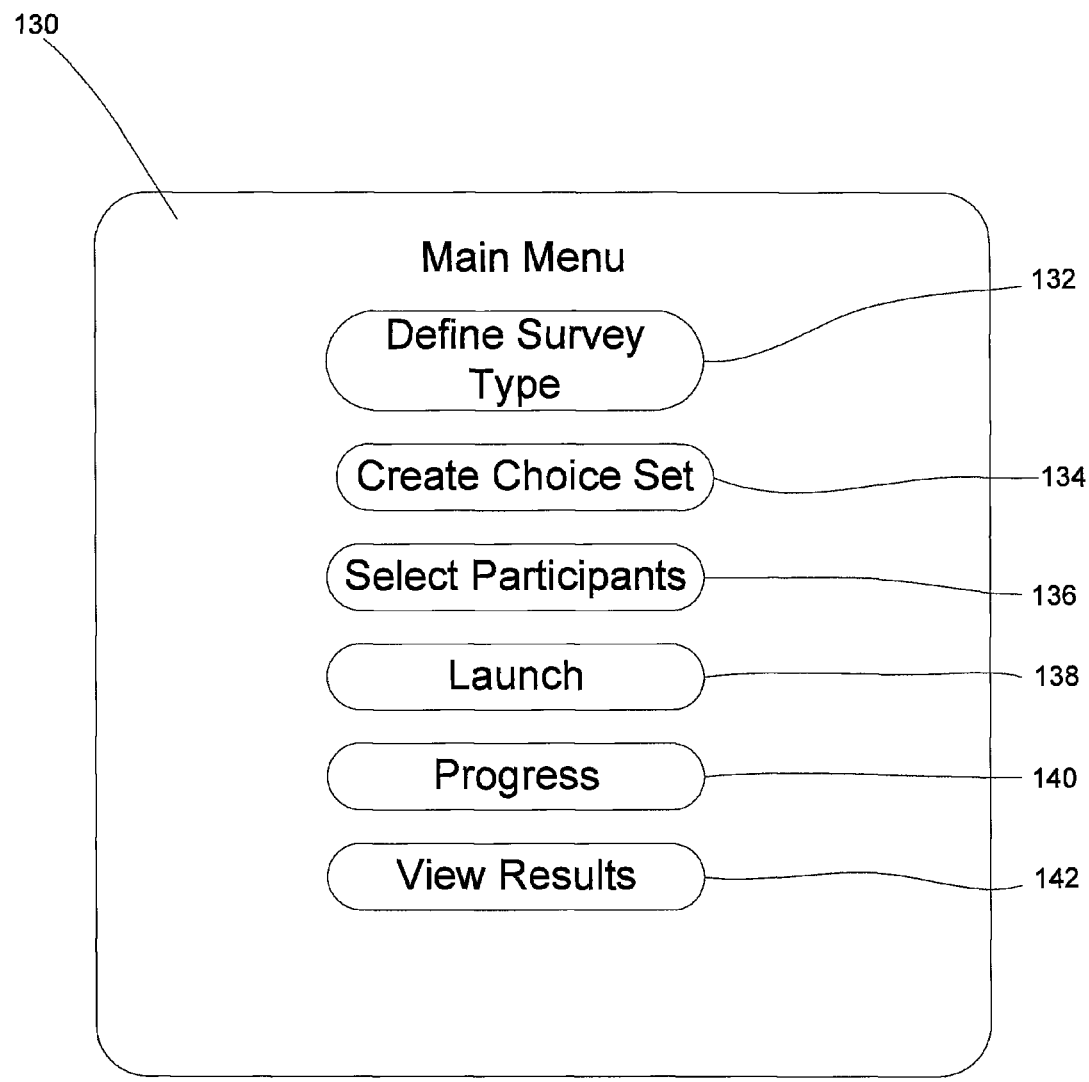
FIG. 2 is a diagram of a computer generated user interface that allows a survey administrator to define a social choice survey in accordance with the present disclosure.

Referring now to FIG. 2, there is shown a main menu page 130 of the user interface 117 displayed on the remote computer 116. The main menu page 130 may be the first portion of the user interface 117 displayed on the remote computer 116. The main menu page 130 allows an administrator to select and define the necessary components of a social choice survey. The main menu page 130 may include a define survey type link 132, a create choice set link 134, select participants link 136, a launch link 138, a progress link 140, and a view results link 142. The links 132-142 may be selected by an administrator scrolling over the link with a mouse and clicking. Alternatively, an administrator may select the links 132-142 using a touch screen interface or any other type of selection device.

Figure 3:
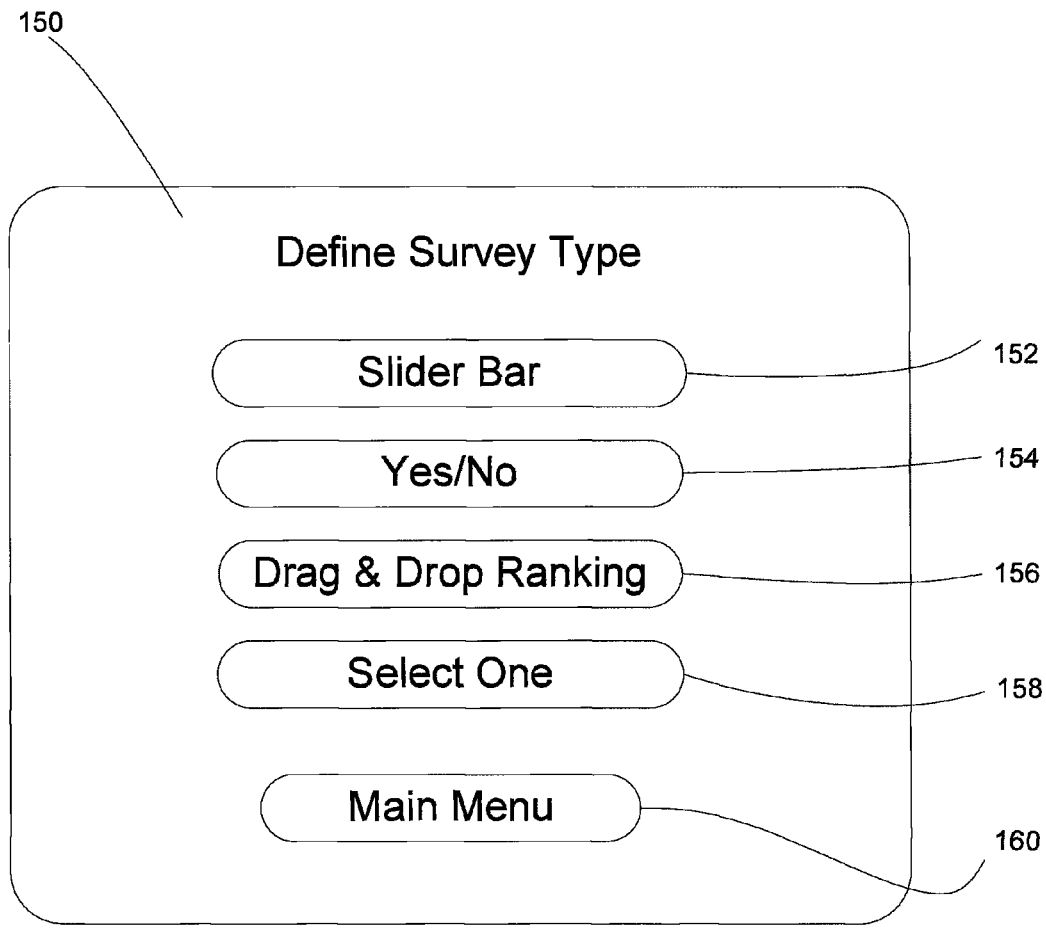
FIG. 3 is a diagram of a computer generated user interface that allows a survey administrator to define a type for a social choice survey in accordance with the present disclosure.

An administrator may first choose the define survey type link 132. When selected, the define survey type link 132 may link to a define survey type page 150 of the user interface 117 as shown in FIG. 3. The define type page 150 may include a variety of choices that allows an administrator to select the type or form of social choice survey desired to be created. In particular, the define survey type page may allow an administrator to define the type of input received from survey participants. The define type page 150 may include various selections, including a slider bar box 152, a yes/no box 154, drag & drop ranking box 156, and a select one box 158. Selection of the slider bar box 152 will cause the social choice survey to include a virtual slider bar to receive responses from participants. Selection of the yes/no box 154 will cause the social choice survey to include yes/no check boxes to receive responses from participants. Selection of the drag & drop ranking box 156 will cause the social choice survey to include virtual objects that may be dragged and dropped by a participant to rank the virtual objects. Selection of the select one box 158 will cause the social choice survey to include multiple virtual objects, one of which may be selected by a participant in response to the social choice survey. After an administrator has selected one of the boxes 152-158, the administrator may return to the main menu page 130 by selecting link 160.

Figure 4:
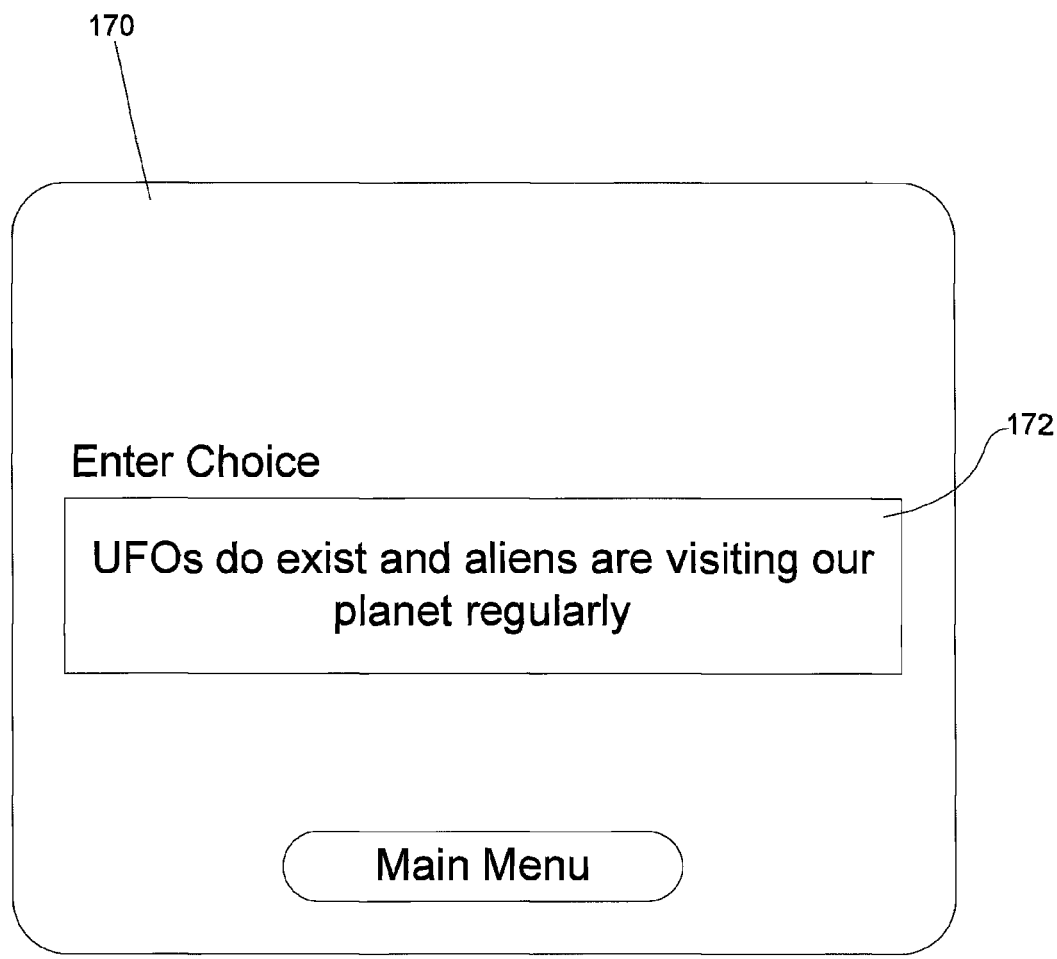
FIG. 4 is a diagram of a computer generated user interface that allows a survey administrator to define a social choice survey in accordance with the present disclosure.

Next, the administrator may select the create choice set link 134 on the main menu page 130 shown in FIG. 2 that will lead to a page that allows the administrator to define a question and corresponding choice set for the survey. The form of the page to which the create choice set link 134 leads may be dependent upon the survey type selected on the define survey type page 150 shown in FIG. 3. If the type selected was the slider bar box 152 (FIG. 3), the create choice set link 134 will lead to page 170 shown in FIG. 4. The page 170 may prompt the administrator to input the text of the question to be posed to survey participants into a text box 172. The response to the question should be compatible for use with a slider bar. If the survey type selected was the yes/no box 154 (FIG. 3), the create choice set link 134 may also lead to page 170 shown in FIG. 4. In this case, the survey question entered into box 172 should be compatible for use with yes/no check boxes.

Figure 5:
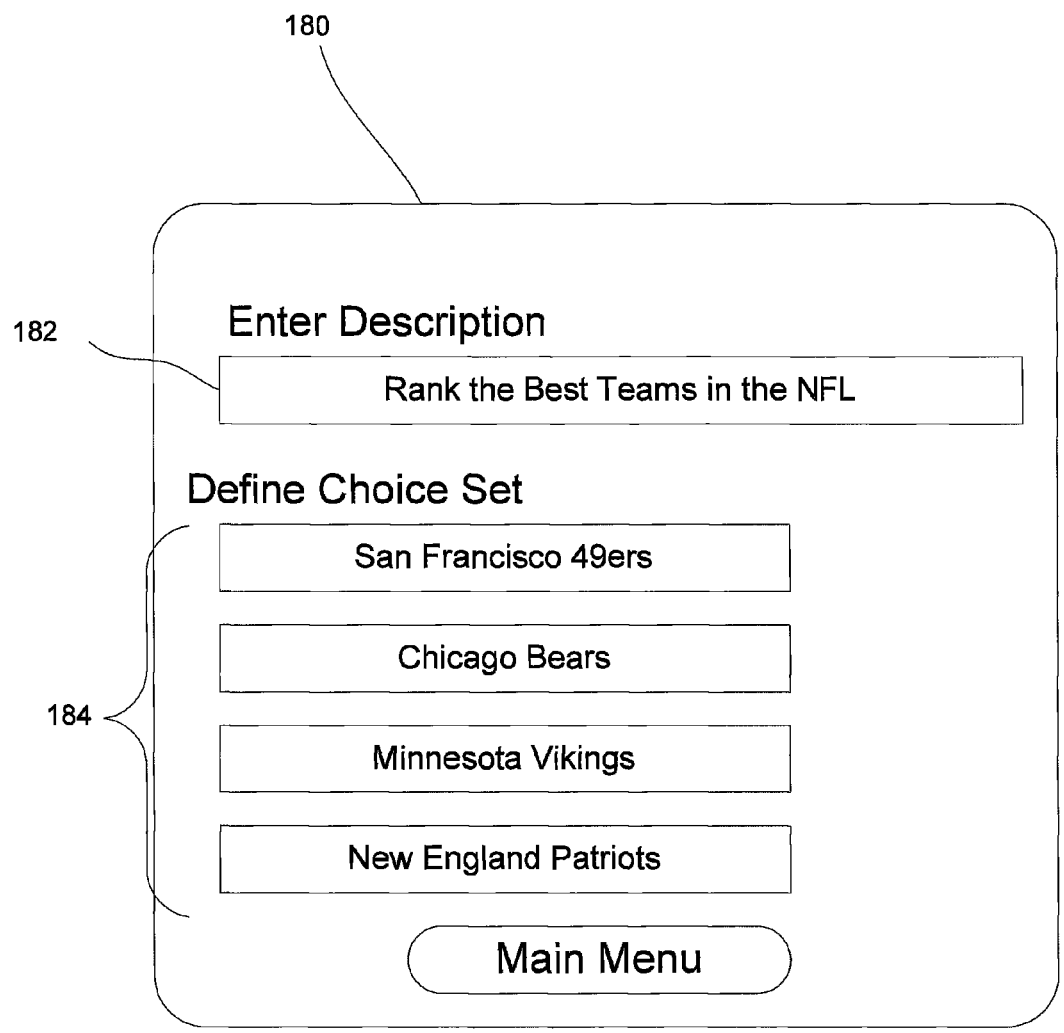
FIG. 5 is a diagram of a computer generated user interface that allows a survey administrator to define a social choice survey in accordance with the present disclosure.
Figure 6:
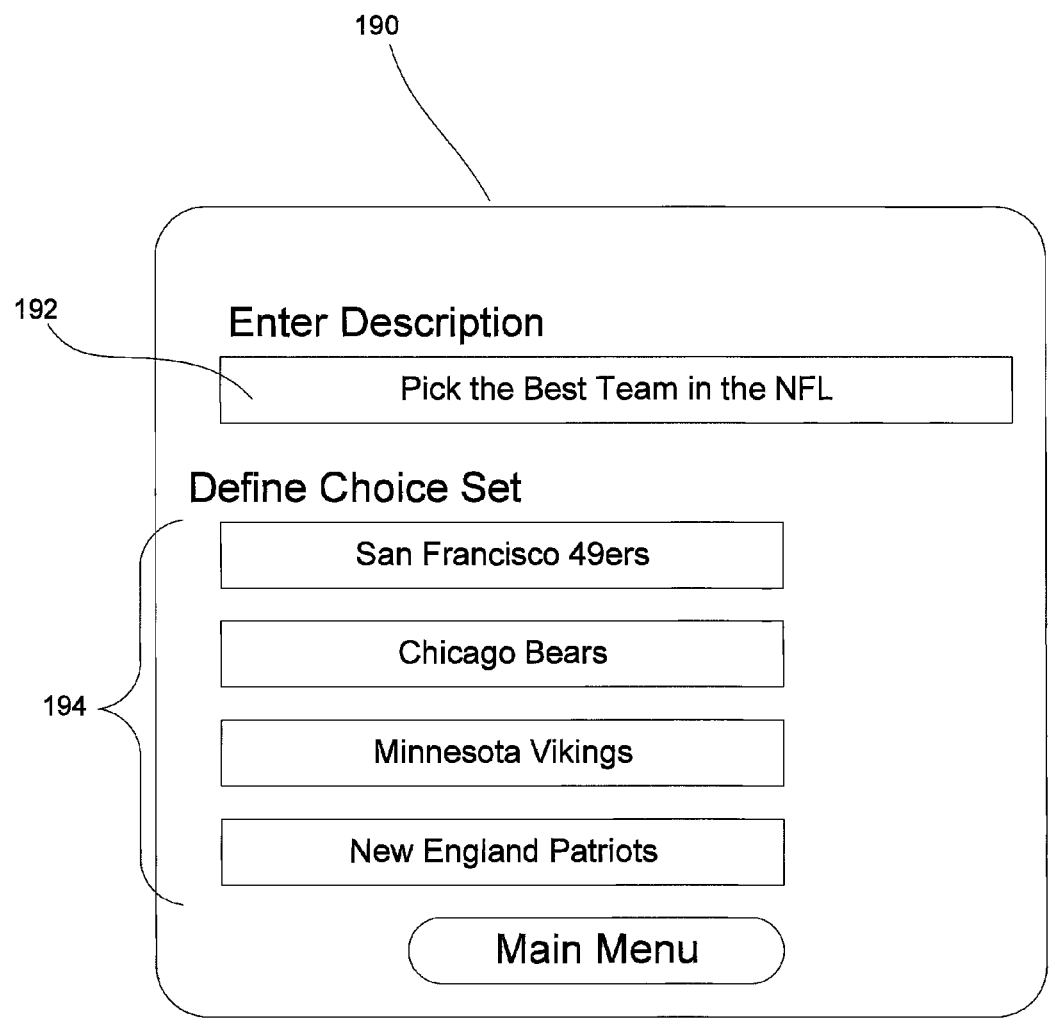
FIG. 6 is a diagram of a computer generated user interface that allows a survey administrator to define a social choice survey in accordance with the present disclosure.

If the survey type selected was the drag & drop ranking box 156 (FIG. 3), the create choice set link 134 on the main menu page 130 shown in FIG. 2 will link to page 180 shown in FIG. 5. The page 180 may prompt the administrator to enter the question of the social choice survey into a box 182 and the specific candidates to be ranked in boxes 184. If the survey type selected was the select one box 158 (FIG. 3), the create choice set link 134 on the main menu page 130 shown in FIG. 2 will link to page 190 shown in FIG. 6. The page 190 may prompt the administrator to enter the question of the social choice survey into a box 192 and the possible candidates into boxes 194.

Once the administrator has provided data defining the choice set through the create choice set link 134 on the main menu page 130 in FIG. 2, the data entered by the administrator may be transmitted over the network 114 and stored in the choice set database 108 by the social choice administrator server 100 as shown in FIG. 1. The administrator may be allowed to edit the data in the choice set database 108.

Figure 7:
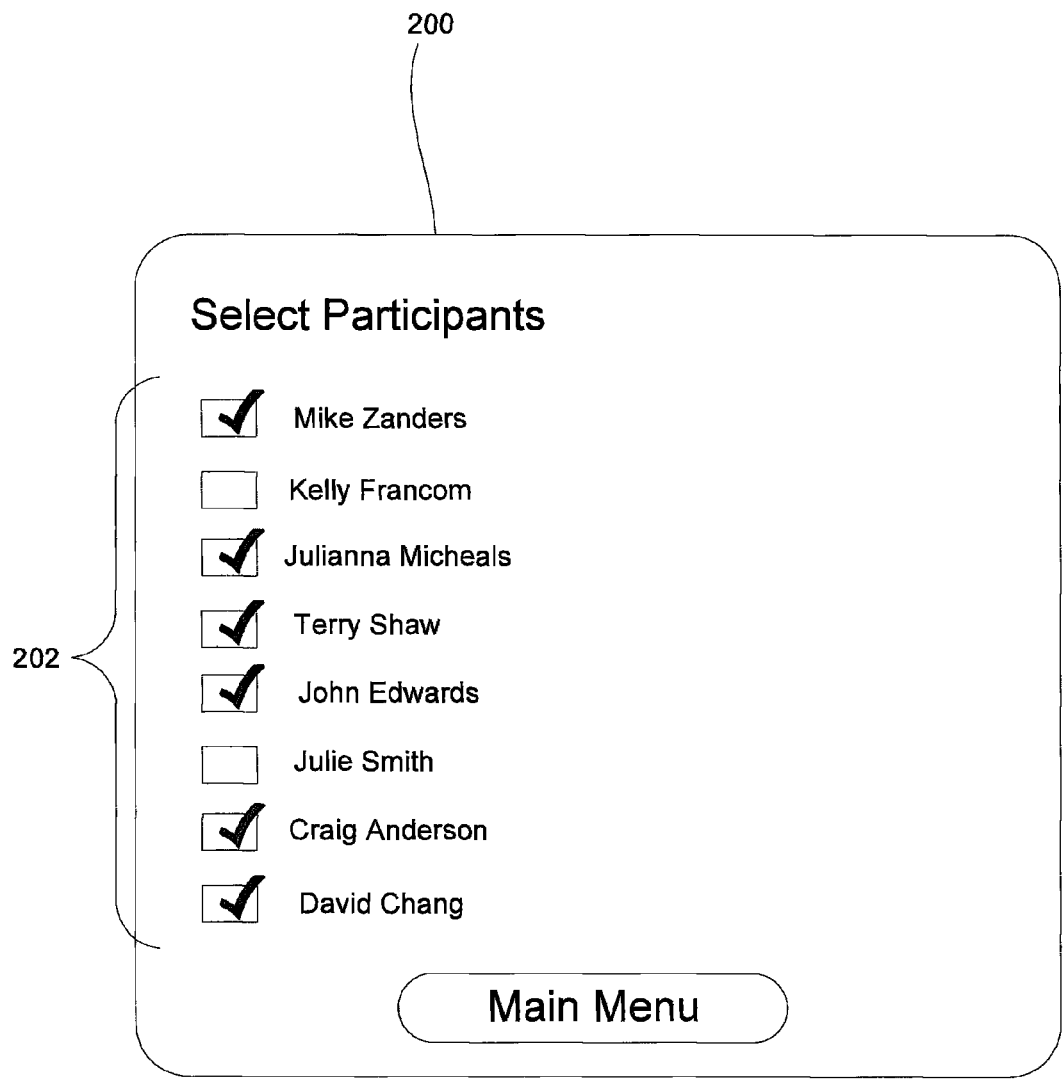
FIG. 7 is a diagram of a computer generated user interface that allows a survey administrator to select participants for a social choice survey in accordance with the present disclosure.

Next, the administrator may choose the select participants link 136 on the main menu page 130 shown in FIG. 2 that will link to a page 200 as shown in FIG. 7. The page 200 allows the administrator to select participants in the social choice survey. The page 200 may comprise a list 202 of selectable participants. The list 202 may include actual names or other participant identifiers, including email addresses. Alternatively, the list 202 may include grouping of participants, where each grouping contains one or more participants. The list 202 may be generated from data stored in the participant database 113 shown in FIG. 1. In an embodiment of the present disclosure, the list 202 may be generated from an account associated with the administrator. For example, the list 202 may be generated from an electronic address book of the administrator. The list 202 may be generated from a list of contacts, sometimes referred to as "friends," on a social media website, such as Facebook or Twitter. In an embodiment of the present disclosure, the list 202 may be generated from members of an online community such that the participants in the social choice survey are selected from members of the online community. It will be appreciated that the list 202 of selectable participants may be generated from an online account of the administrator with a third-party website or a third-party program. Data representing the selected participants may be stored in the participant database 113.

Once the participants have been selected, the administrator may choose the select the launch link 138 on the main menu page 130 shown in FIG. 2. In response to the selection of the launch link 138, the social choice administrator server 100 may automatically notify the selected participants that they have been selected to participate in a social choice survey. In an embodiment of the present disclosure, the social choice administrator server 100 may send electronic messages, e.g., emails, to each of the selected participants. The electronic messages may include a link to an electronic page with a participant interface containing the social choice survey. In an embodiment of the present disclosure, the electronic message may comprise the participant interface for the social choice survey embedded therein. In an embodiment of the present disclosure, the electronic message may be posted on an account of a participant with a social media website or other type of third-party website.

Referring now back to FIG. 1, as described above, an electronic notification may be sent to a participant regarding the social choice survey. A participant may receive or access the electronic notification through a remote computer 118. The participant may also receive or access the electronic notification through a wireless mobile device 124, such as an Internet enabled smart phone. In particular, the wireless mobile device 124 may be connected to the social choice administrator server 100 via a wireless communications network 120 in communication with the network 114. The wireless communications network 120 may send wireless signals 122 to the wireless mobile device 124. It will be understood that the remote computer 118 may be selected from any type of electronic device, including a desktop computer, a laptop computer, a wireless mobile device, a hand-held computing device or any other computing device capable of communicating over the network 114 with the social choice administrator server 100. Thus, it will be appreciated that the following discussion may apply to both the remote computer 118 and the wireless mobile device 124.

The social choice administrator server 100 may generate a participant interface 119 for display to the participant on the remote computer 118. The participant interface 119 may allow the participant to easily provide responses to the social choice survey. The results obtained through the participant interface 119 may be transmitted to and stored by the social choice administrator server 100 in the results database 112. The participant interface 119 may vary depending on the type of social choice survey defined by the administrator. The participant interface 119 may be displayed within a computer program, such as a web browser, running on the remote computer 118.

Referring now to FIG. 8, the participant interface 119 may include a participant interface 119A. The participant interface 119A includes an instructional statement 210, the social choice survey question 212, and a virtual slider bar 214 for allowing a participant to input a response. It will be appreciated that the advantage of the slider bar 214 is that it allows a participant to provide a response within a preset range, such as a numerical range. Multiple social choice survey questions may be provided on the participant interface 119A. The participant's response may be submitted when the participant chooses the submit box 216.

Figure 9:
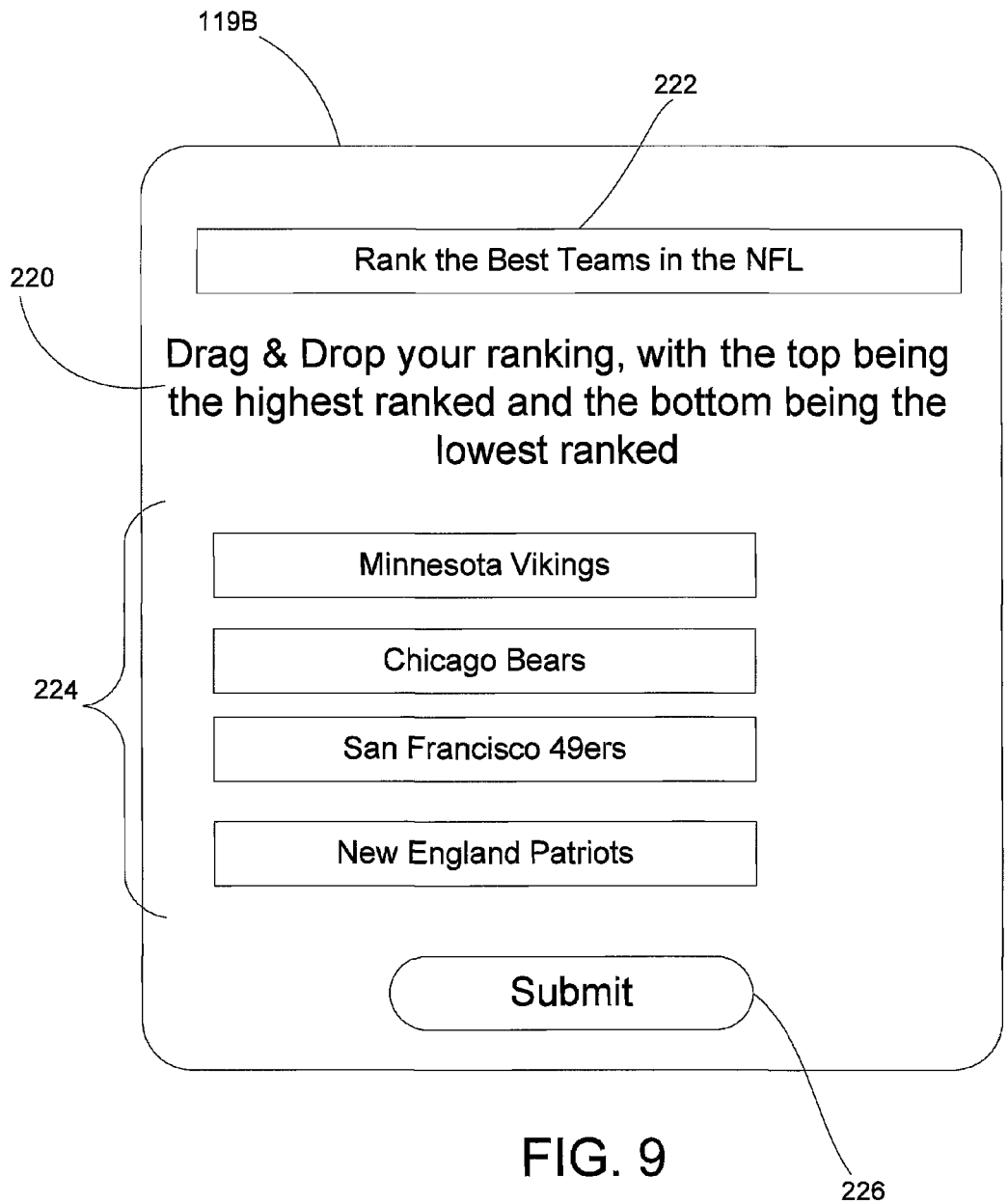
FIG. 9 is a diagram of a computer generated user interface that allows a participant to enter responses to a social choice survey in accordance with the present disclosure.

Referring now to FIG. 9, the participant interface 119 may include a participant interface 119B. The participant interface 119B includes an instructional statement 220, the social choice survey question 222, and a choice set comprised of virtual objects 224. The virtual objects 224 may be dragged and dropped on the participant interface 119B by a participant to form a ranking. The participant's response may be submitted when the participant chooses the submit box 226.

Referring now to FIG. 10, the participant interface 119 may include a participant interface 119C. The participant interface 119C includes an instructional statement 230, the social choice survey question 232, and a choice set comprised of virtual yes/no check boxes 234. The virtual check objects 234 may be selected by a participant. For example, in response to the social choice survey question 232, a participant may check "yes" or "no" using check boxes 234. The participant's response may be submitted when the participant chooses the submit box 236.

Figure 11:
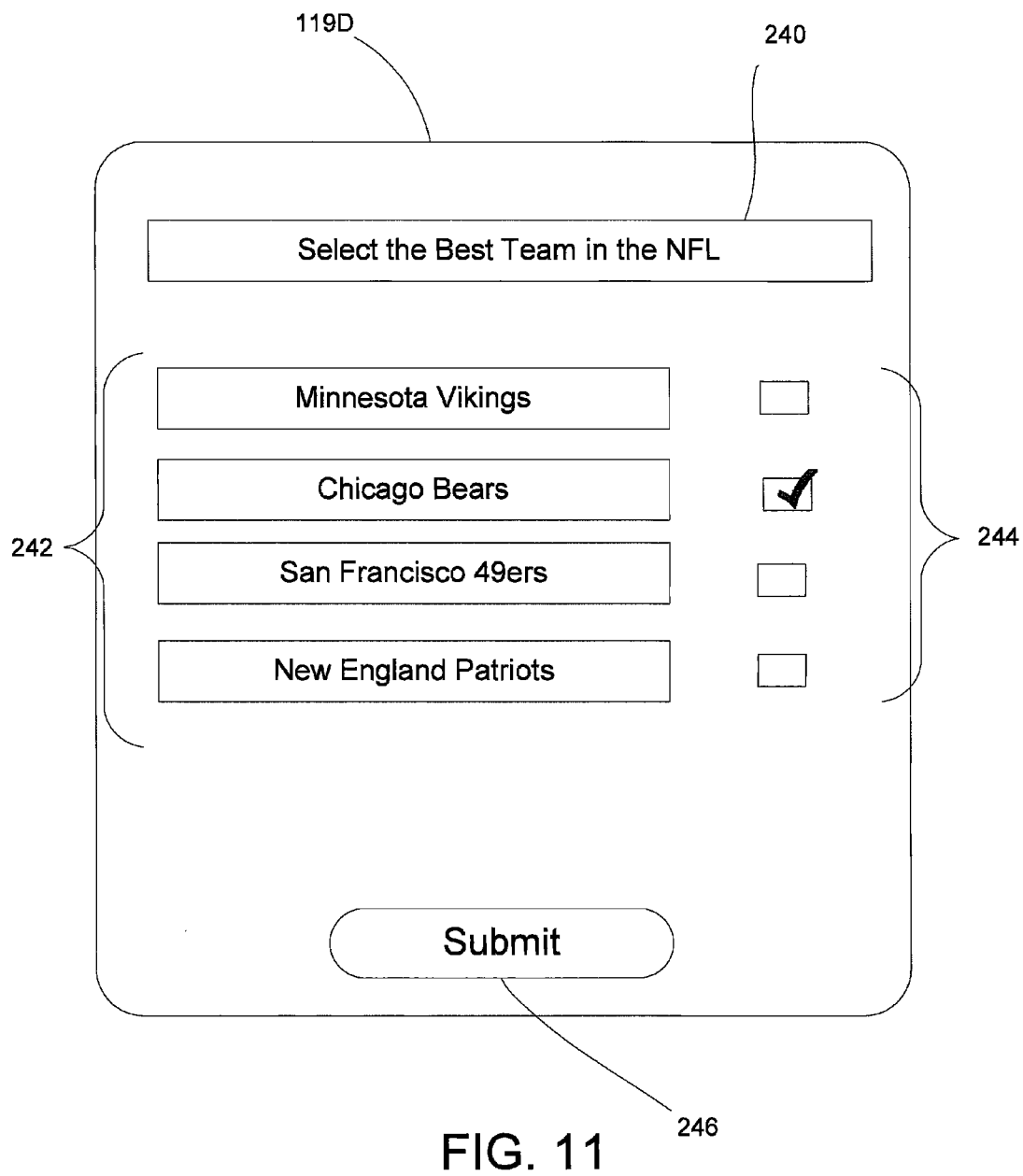
FIG. 11 is a diagram of a computer generated user interface that allows a participant to enter responses to a social choice survey in accordance with the present disclosure.

Referring now to FIG. 11, the participant interface 119 may include a participant interface 119D. The participant interface 119D includes a social choice question 240, a social choice set of candidates 242, and a set of virtual check boxes 244. Using the virtual check boxes 244, a participant may select one of the members of the social choice set 242 in response to the social choice survey question. The participant's response may be submitted when the participant chooses the submit box 246.

Referring now back to FIG. 1, the responses submitted by the participants to the social choice survey through the participant interface 119 may be transmitted to the social choice administrator server 100 and stored in the results database 112. The memory 102 of the social choice administrator server 100 may further include operational instructions, that when executed by the processor 104, cause the social choice administrator server 100 to amalgamate the responses of the different participants into a result. The social choice administrator server 100 may use different approaches to amalgamate the responses of the participants depending on the methodology by which the social choice survey collected the responses. In order to access and view the results, the administrator may access the social choice administrator server 100 at the remote computer 116. The administrator may then select the view results link 142 on the main menu page 130 shown in FIG. 2. In response to the administrator selecting the view results link 142 on the main menu page 130, the social choice administrator server 100 may generate a results page that is transmitted and displayed on the remote computer 116 to the survey administrator.

Figure 12:
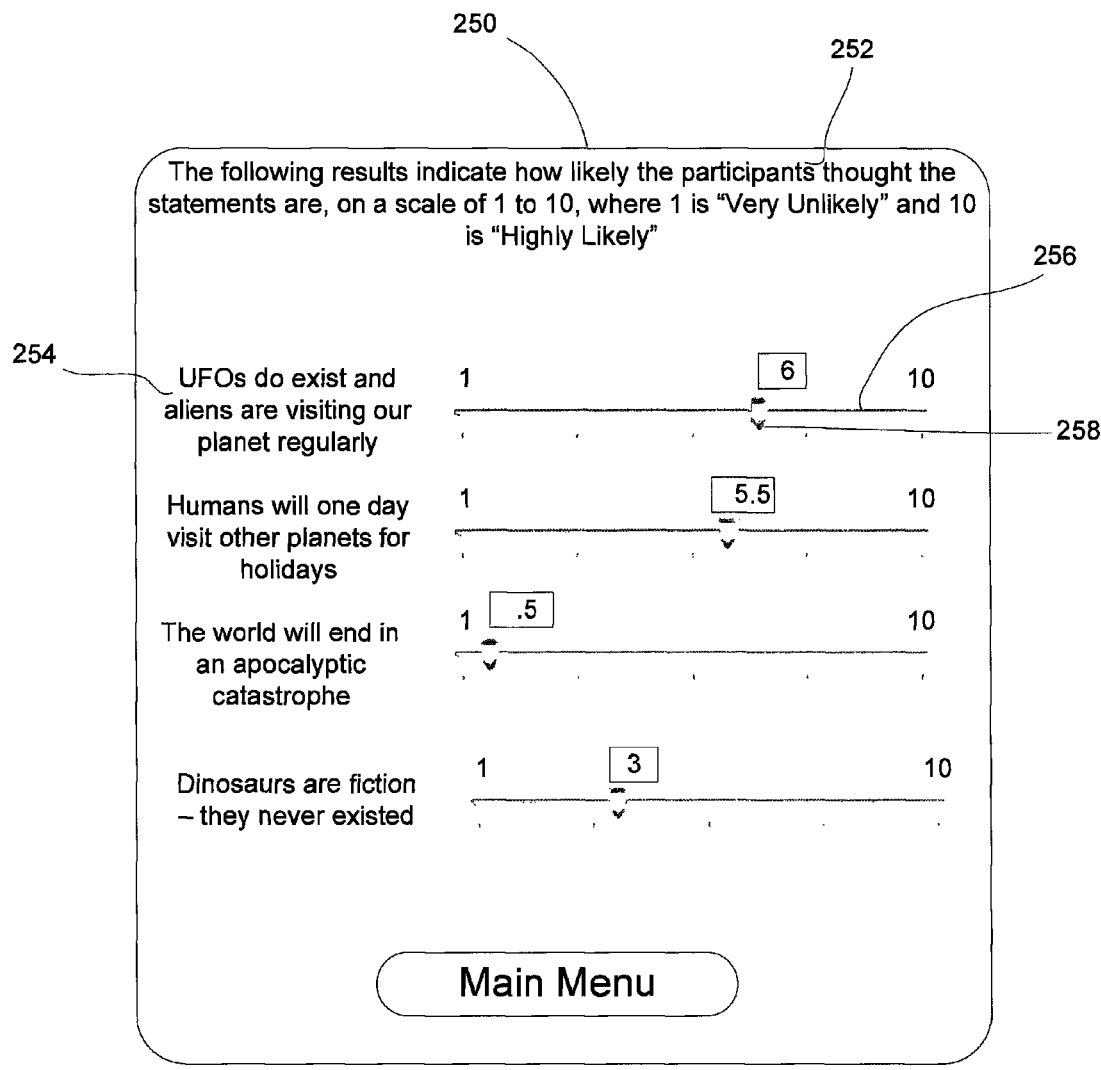
FIG. 12 is a diagram of an electronic page that displays the results of a social choice survey in accordance with the present disclosure.

Referring now to FIG. 12, there is shown a results page 250 generated by the social choice administrator server 100. The results page 250 may be suitable for displaying the results of a social choice survey that utilized virtual slider bars to obtain responses from participants as shown in FIG. 8. The results page 250 may include an informational statement 252 on interpreting the results. The results page 250 may also include a statement of the question 254 posed to participants. The results page 250 may further include a slider bar 256 having a slider 258 that is positioned within a range of the slider bar 256 to display the amalgamated results of the social choice survey. In an embodiment of the present disclosure, the participants' responses may be amalgamated by averaging the responses and displaying the average response of the participants on the slider bar 256 using the slider 258.

Figure 13:
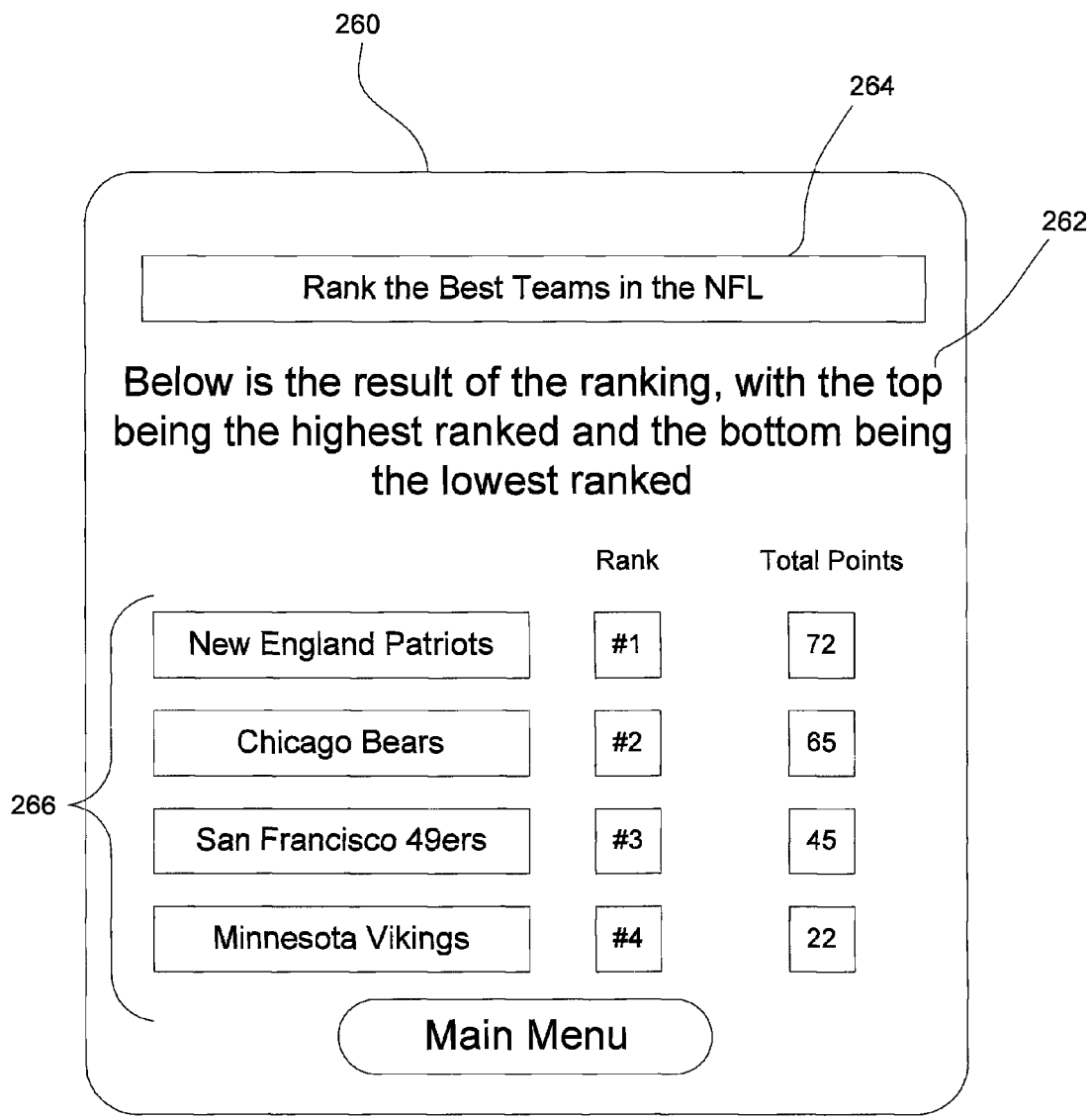
FIG. 13 is a diagram of an electronic page that displays the results of a social choice survey in accordance with the present disclosure.

Referring now to FIG. 13, there is shown a results page 260 generated by the social choice administrator server 100. The results page 260 may be suitable for displaying the results of a social choice survey that utilized drag and drop rankings to obtain responses from participants as shown in FIG. 9. The results page 260 may include an informational statement 262 on interpreting the results. The results page 260 may also include a statement of the question 264 posed to the participants. The results page 260 may further include a visual ranking 266 of the amalgamated results of the social choice survey.

In an embodiment of the present disclosure, the social choice administrator server 100 amalgamates the participants' rankings using the Borda ranking or Borda count method. The Borda count is a single-winner election method in which participants rank candidates in order of preference. The Borda count determines the winner of an election by giving each candidate a certain number of points corresponding to the position in which the candidate is ranked by each participant. The number of points given to candidates for each ranking is determined by the number of candidates standing in the election. Thus, under the simplest form of the Borda count, if there are five candidates in an election, then a candidate will receive five points each time it is ranked first, four for being ranked second, and so on, with a candidate receiving 1 point for being ranked last (or left unranked). In other words, where there are n candidates, a candidate will receive n points for a first preference, n−1 points for a second preference, n−2 for a third, and so on. When all votes have been counted, and the points added up, the candidate with most points "wins." As noted above, the Borda count method is a preferential voting system; because, from each participant, candidates receive a certain number of points, the Borda count is also classified as a positional voting system. The results page 260 may further display the total number of points garnered by each candidate.

Figure 14:
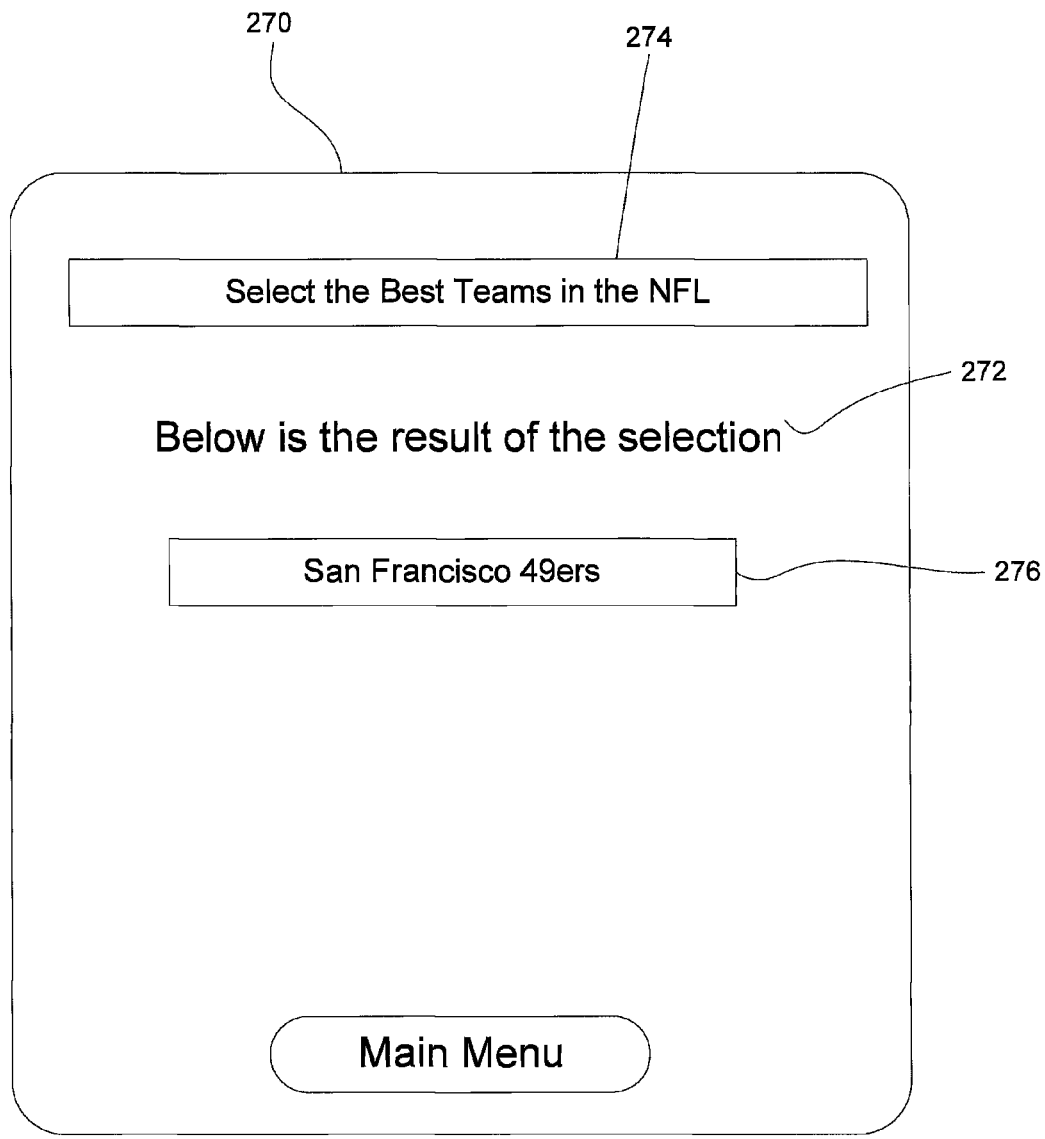
FIG. 14 is a diagram of an electronic page that displays the results of a social choice survey in accordance with the present disclosure.

Referring now to FIG. 14, there is shown a results page 270 generated by the social choice administrator server 100. The results page 270 may be suitable for displaying the results of a social choice survey that utilized a select one methodology to obtain responses from participants as shown in FIG. 11. The results page 270 may include an informational statement 272 on interpreting the results. The results page 270 may also include a statement of the social choice survey question 274 posed to participants. The results page 270 may also include a result 276 of the social choice survey. The result 276 may be determined by the social choice administrator server 100 calculating the selection with the highest number of votes.

Referring now to FIG. 15, there is shown a results page 280 generated by the social choice administrator server 100. The results page 280 may be suitable for displaying the results of a social choice survey that utilized a yes/no methodology to obtain responses from participants as shown in FIG. 10. The results page 280 may include an informational statement 282 on interpreting the results. The results page 280 may also include a statement of the question 284 posed to participants. The results page 280 may also include a result 286 of the social choice survey. The result 286 may be determined by the social choice administrator server 100 calculating the most popular response.

Referring to FIG. 2, throughout the administration of the social choice survey, the administrator may view the progress of the survey by choosing the progress link 140. In response to this selection, the social choice administrator server 100 may generate at least one of a list of participants who have not yet participated in the survey and a list of participants who have participated in the survey.

Figure 16:
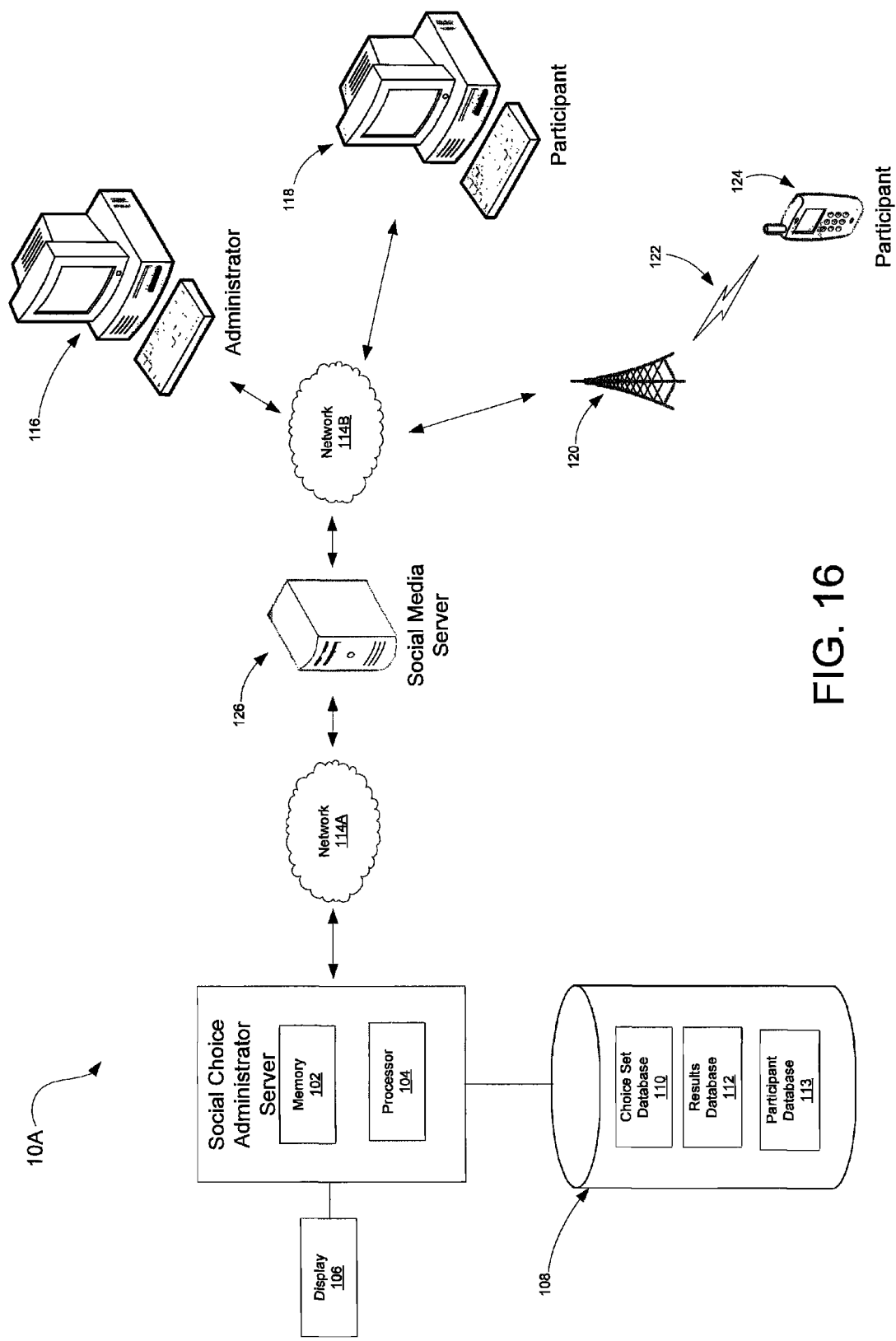
FIG. 16 is a block diagram of a social survey system and environment in which the present invention may be practiced.

Referring now to FIG. 16, there is depicted an exemplary social choice engine environment 10A according to an embodiment of the present disclosure where like reference numerals depict like components. The social choice engine environment 10A depicts the social choice administrator server 100 connected to a social media server 126 over a network 114A. The social media server 126 may be connected to the remote computer 116 of the administrator, and the remote computer 118 of the participant, and the wireless mobile device 124 of the participant, over a network 114B. The social choice engine environment 10A may allow an administrator using the remote computer 116 to define and administer a social choice survey through a social media website hosted by the social media server 126. Participants in the social choice survey may be selected from an online community on the social media website, such as the contacts and friends of the administrator. It will be appreciated that the social choice engine environment 10A shown in FIG. 16 allows a member of an online community to administer a social choice survey to other members of the online community through a social media website.

Figure 17:
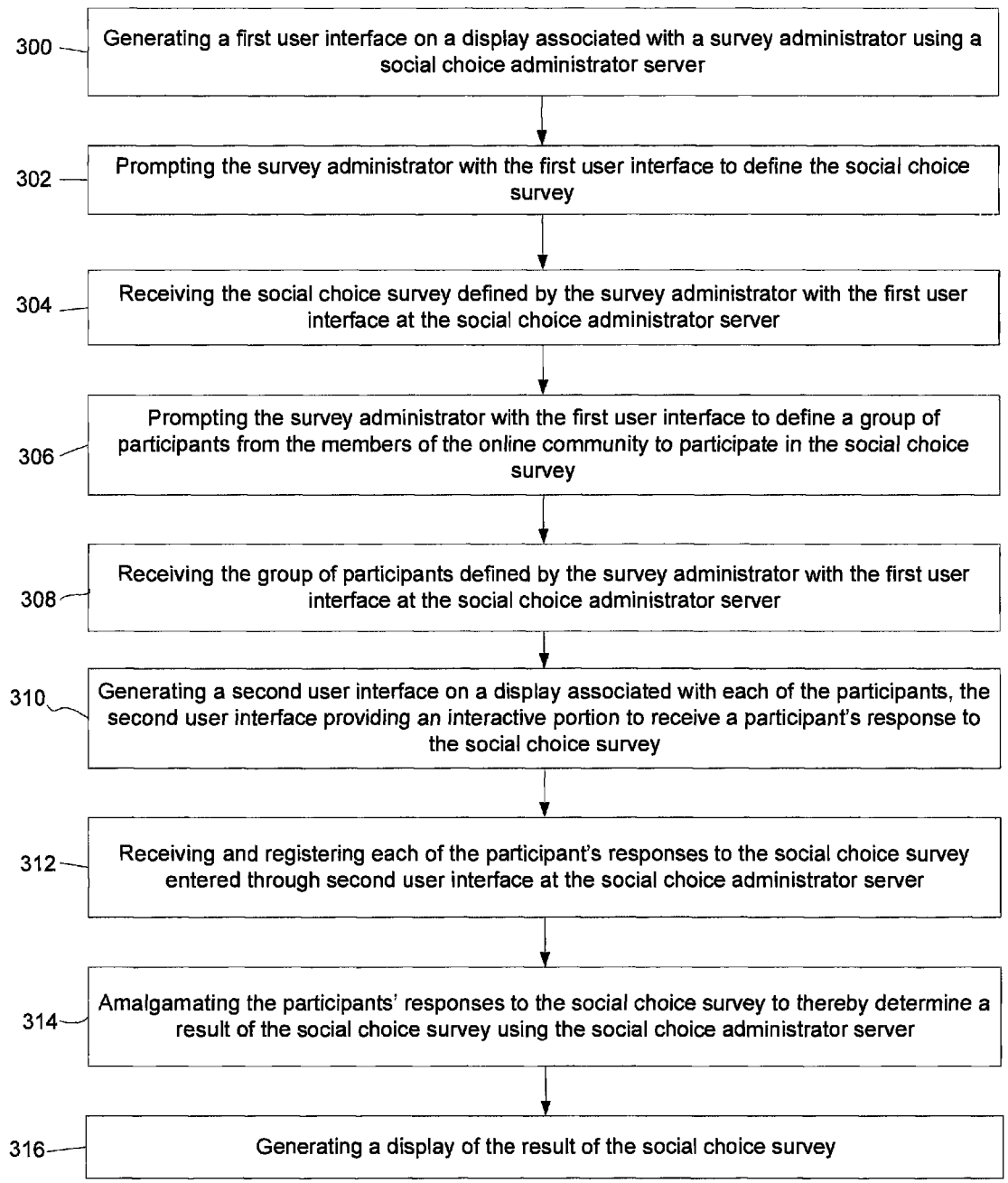
FIG. 17 is a high level logical flowchart of an exemplary process by which a social choice administrator server administers a social choice survey.

FIG. 17 illustrates a high level logical flowchart of a process by which the social choice administrator server 100 administers a social choice survey. As illustrated, the process begins at block 300 where the social choice administrator server 100 generates a first user interface on a display of a computing device associated with a survey administrator. The computing device may be a remote computer or a wireless mobile device. The computing device of the survey administrator may access the social choice administrator server 100 directly over a network or through a third-party server, such as a social media server. At block 302, the social choice administrator server 100 may prompt the survey administrator with the first user interface to define the social choice survey. At block 304, the social choice administrator server 100 may receive the social choice survey as defined by the survey administrator through the first interface.

At block 306, the social choice administrator server 100 will prompt the survey administrator with the first user interface to define a group of participants from the members of an online community to participate in the social choice survey. At block 308, the social choice administrator server 100 may receive data identifying a group of participants defined by the survey administrator. At block 310, the social choice administrator server 100 generates a second user interface on the displays of computing devices associated with the participants. The second user interface may comprise an interactive portion to receive participants' responses to the social choice survey. The interactive portion may include virtual slider bars, check boxes, and drag and drop virtual objects. At block 312, the participants' responses to the social choice survey are received at the social choice administrator server 100. At block 314, the social choice administrator server 100 may amalgamate the participants' responses to the social choice survey. At block 316, the results of the social choice survey may be displayed by the social choice administrator server 100 to the survey administrator on a computing device.

In an embodiment, the social choice engine of the present invention comprises a social choice administrator server that includes a set of operating instructions stored in a memory, that when executed by a processor, performs the steps of: generating a participant interface for receiving information among a set of presented alternatives, performing an algorithm that amalgamates the responses of the participants, and generating an administrator's interface that allows an administrator to enter information to be evaluated, define the participants, and view the results generated by the social choice administrative survey.

In an embodiment, the interface generated by the social choice administrator server comprises one or more boxes or frames that contains one or more questions or issues to which the participants are asked to respond. For each question or issue there may be provided at least one interactive input, such as an associated slider bar, drag and drop, or check box. For example, the participant can click and drag the slider mechanism to register the participant's response. In particular, the participant would click and drag the slider to register his or her response. Instruction indicia could indicate that the response sought is to be registered by sliding the slider along a scale of 1 to 10, where 1 means "Very Unlikely" and 10 means "Highly Likely." After finishing the responses in the box or frame, virtual buttons are available to allow the participate to move to the next or previous page.

In an embodiment of the present disclosure, the algorithm performed by the social choice administrator server amalgamates the rankings provided by the participants using the Borda ranking or Borda count method. The Borda count is a single-winner election method in which voters rank candidates in order of preference. The Borda count determines the winner of an election by giving each candidate a certain number of points corresponding to the position in which he or she is ranked by each voter. Once all votes have been counted the candidate with the most points is the winner. Because it sometimes elects broadly acceptable candidates, rather than those preferred by the majority, the Borda count is often described as a consensus-based electoral system, rather than a majoritarian one.

Those having ordinary skill in the relevant art will appreciate the advantages provide by the features of the present disclosure. For example, it is a feature of the present disclosure to provide a social choice engine that permits the administration of a social choice survey over a computer network to a community of online participants. In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

The subject matter claimed is:

1. A system to facilitate conducting a social choice survey of members of an online community associated with a computer network, the system comprising:

a computer accessible to the computer network, the computer defining a social choice administrator server, the social choice administrator server having a memory coupled to a processor;

operational instructions stored in the memory of the social choice administrator server that, when executed by the processor of the social choice administrator server, cause the social choice administrator server to selectively perform the operations of:

generate a first user interface on a computer display associated with a survey administrator, prompt the survey administrator with the first user interface to define the social choice survey type selected from a slider bar survey, a yes/no survey, a drag and drop survey, and a select one survey, receive the social choice survey defined by the survey administrator with the first user interface, prompt the survey administrator with the first user interface to define a group of participants from the members of the online community to participate in the social choice survey, wherein the group of participants consists of friends of a single user on a social media website, receive the group of participants defined by the survey administrator with the first user interface, generate a second user interface on a computer display associated with each of the participants, the second user interface providing an interactive portion to receive a participant's response to the social choice survey and being posted on each participant's social media account on the social media website, receive and register each of the participants' responses to the social choice survey collected with the second user interface, prompt the survey administrator to view and to select a progress of the social choice survey, in response to the selection of the progress of the social choice survey, generate a display of the progress of the social choice survey, including at least one of a list of participants who have participated in the social choice survey and a list of participants who have not participated in the social choice survey, amalgamate the participants' responses to the social choice survey to thereby determine a result of the social choice survey, and show the result of the social choice survey on a computer display of the survey administrator.

2. The system of claim 1, wherein the operational instructions, that, when executed by the processor, cause the social choice administrator server to further perform the operations of: sending an electronic message over the computer network to each of the participants in the group of participants, the electronic message indicating that the participant has been selected to participate in the social choice survey.

3. The system of claim 2, wherein the electronic message comprises a link to the second user interface.

4. The system of claim 3, wherein the electronic message comprises the second user interface.

5. The system of claim 1, wherein the interactive portion of the second user interface comprises a virtual slider that allows a participant to select a response within a preset range.

6. The system of claim 1, wherein the interactive portion of the second user interface comprises drag and drop virtual objects that allow a participant to rank answers by order of preference.

7. The system of claim 1, wherein the interactive portion of the second user interface comprises virtual buttons.

8. The system of claim 1, wherein the operational instructions, that, when executed by the processor, cause the social choice administrator server to further perform the operations of: prompting the survey administrator with the first user interface to define a choice set in conjunction with the social choice survey.

9. The system of claim 1, wherein the operational instructions, that, when executed by the processor, cause the social choice administrator server to further perform the operations of: amalgamating the participants' responses to the social choice survey using a single-winner election algorithm.

10. A method of administering a social choice survey to members of an online community associated with a computer network, the method comprising:

generating a first user interface on a display associated with a survey administrator;

prompting the survey administrator with the first user interface to define the social choice survey type selected from a slider bar survey, a yes/no survey, a drag and drop survey, and a select one survey;

receiving the social choice survey defined by the survey administrator with the first user interface at a social choice administrator server;

prompting the survey administrator with the first user interface to define a group of participants from the members of the online community to participate in the social choice survey, wherein the group of participants consists of friends of a single user on a social media website;

receiving the group of participants defined by the survey administrator with the first user interface at the social choice administrator server;

generating a second user interface on a display associated with each of the participants, the second user interface providing an interactive portion to receive a participant's response to the social choice survey and being posted on each participant's social media account on the social media website;

receiving and registering each of the participant's responses to the social choice survey entered through second user interface at the social choice administrator server;

prompting the survey administrator to view and to select a progress of the social choice survey;

in response to the selection of the progress of the social choice survey, generating a display of the progress of the social choice survey, including at least one of a list of participants who have participated in the social choice survey and a list of participants who have not participated in the social choice survey in response to a request by the survey administrator;

amalgamating the participants' responses to the social choice survey to thereby determine a result of the social choice survey using the social choice administrator server; and generating a display of the result of the social choice survey on a computer display of the survey administrator.

11. The method of claim 10, further comprising sending an electronic message over the computer network to each of the participants in the group of participants, the electronic message indicating that the participant has been selected to participate in the social choice survey.

12. The method of claim 11, wherein the electronic message comprises a link to the second user interface.

13. The method of claim 12, wherein the electronic message comprises the second user interface embedded therein.

14. The method of claim 10, wherein the interactive portion of the second user interface comprises a virtual slider that allows a participant to select a response within a preset range.

15. The method of claim 10, wherein the interactive portion of the second user interface comprises drag and drop virtual objects that allow a participant to rank responses by order of preference.

16. The method of claim 10, wherein the interactive portion of the second user interface comprises virtual and clickable buttons.

17. The method of claim 10, further comprising prompting the survey administrator with the first user interface to define a choice set in conjunction with the social choice survey.

18. The method of claim 10, further comprising amalgamating the participants' responses to the social choice survey using a single-winner election algorithm.

19. The method of claim 10, further comprising maintaining a list of participants who have not yet taken the social choice survey.

20. A system to facilitate conducting a social choice survey of members of an online community associated with a computer network, the system comprising:

- a server computer at a site accessible to the computer network the server computer having a processor, memory coupled to the processor to store operating instructions therein, and a graphical display coupled to the processor for displaying graphical images;
- a data storage accessible to the processor of the server computer and containing database records about social choice surveys;
- operational instructions stored in the memory of the computer server that, when executed by the processor of the computer server, cause the computer server to selectively perform the operations of:
- generate a first user interface on a computer display associated with a survey administrator,
- prompt the survey administrator with the first user interface to define the social choice survey,
- receive the social choice survey defined by the survey administrator with the first user interface,
- prompt the survey administrator with the first user interface to define a group of participants from the members of the online community to participate in the social choice survey, wherein the group of participants are all friends of a single user of a social media website,
- receive the group of participants defined by the survey administrator with the first user interface,
- generate a second user interface on a computer display associated with each of the participants, the second user interface providing an interactive portion to receive a participant's response to the social choice survey and being posted on each participant's social media account on the social media website,
- receive and register each of the participants' responses to the social choice survey collected with the second user interface,
- prompt the survey administrator to view and to select a progress of the social choice survey,
- in response to the selection of the progress of the social choice survey, generate a display of the progress of the social choice survey, including
- at least one of a list of participants who have participated in the social choice survey and a list of participants who have not participated in the social choice survey,
- amalgamate the participants' responses to the social choice survey to thereby determine a result of the social choice survey, and
- show the result of the social choice survey on a computer display of the survey administrator.

* * * * *